(12) United States Patent
Luo et al.

(10) Patent No.: US 11,787,729 B2
(45) Date of Patent: Oct. 17, 2023

(54) GLASS COMPOSITIONS WITH HIGH REFRACTIVE INDEXES AND LOW DENSITIES

(71) Applicant: CORNING INCORPORATED, Corning, NY (US)

(72) Inventors: Jian Luo, Painted Post, NY (US); Lina Ma, Corning, NY (US); Alexander I. Priven, Sojeong-Myeon (KR)

(73) Assignee: Corning Incorporated, Corning, NY (US)

( * ) Notice: Subject to any disclaimer, the term of this patent is extended or adjusted under 35 U.S.C. 154(b) by 114 days.

(21) Appl. No.: 17/313,281

(22) Filed: May 6, 2021

(65) Prior Publication Data

US 2021/0355022 A1    Nov. 18, 2021

Related U.S. Application Data

(60) Provisional application No. 63/026,309, filed on May 18, 2020.

(51) Int. Cl.
*C03C 3/097* (2006.01)

(52) U.S. Cl.
CPC .................. *C03C 3/097* (2013.01)

(58) Field of Classification Search
CPC .......... C03C 3/097; C03C 3/062; C03C 3/078
See application file for complete search history.

(56) References Cited

U.S. PATENT DOCUMENTS

| | | |
|---|---|---|
| 2,206,081 A | 7/1940 | Eberlin |
| 2,472,448 A | 6/1949 | Sun |
| 3,022,182 A | 2/1962 | Cleek et al. |
| 3,589,918 A | 6/1971 | Jahn |
| 4,149,895 A | 4/1979 | Boudot et al. |
| 4,526,874 A | 7/1985 | Grabowski et al. |
| 5,407,872 A | 4/1995 | Komori et al. |
| 5,716,706 A | 2/1998 | Morris |
| 5,815,625 A | 9/1998 | Sugawara |
| 5,952,256 A | 9/1999 | Morishita et al. |
| 6,599,853 B2 | 7/2003 | Sugimoto et al. |

(Continued)

FOREIGN PATENT DOCUMENTS

| | | |
|---|---|---|
| CN | 108139536 A | 6/2018 |
| DE | 1596856 A1 | 2/1972 |

(Continued)

OTHER PUBLICATIONS

International Search Report and Written Opinion of the International Searching Authority; PCT/US2021/031088 dated Aug. 9, 2021, 10 pages; European Patent Office.

(Continued)

*Primary Examiner* — Karl E Group
*Assistant Examiner* — Cameron K Miller
(74) *Attorney, Agent, or Firm* — Amy T. Lang

(57) ABSTRACT

A glass composition having a content of $SiO_2$ that is greater than or equal to about 44.0 mol. % and less than or equal to about 60.0 mol. % and a content of ZnO that is less than or equal to about 1.0 mol. %. Additionally, the glass composition is essentially free of Pb and Bi. The glass composition also has a refractive index that is greater than or equal to 1.75 and a density that is less than or equal to about 4.5 $g/cm^3$.

19 Claims, 4 Drawing Sheets

(56) References Cited

U.S. PATENT DOCUMENTS

| | | |
|---|---|---|
| 6,940,220 B2 | 9/2005 | Nakashima et al. |
| 7,641,730 B2 | 1/2010 | Fujiwara et al. |
| 7,897,531 B2 | 3/2011 | Ishioka |
| 8,124,551 B2 | 2/2012 | Hashimoto |
| 8,178,452 B2 | 5/2012 | Shimizu et al. |
| 8,664,133 B2 | 3/2014 | Uehara |
| 9,034,779 B2 | 5/2015 | Sato |
| 9,670,089 B2 | 6/2017 | Yanase et al. |
| 2007/0296739 A1 | 12/2007 | Lonn |
| 2009/0105061 A1 | 4/2009 | Fujiwara et al. |
| 2018/0022635 A1 | 1/2018 | Luo et al. |
| 2018/0141851 A1 | 5/2018 | Amma et al. |
| 2018/0244559 A1 | 8/2018 | Akiba et al. |
| 2018/0251395 A1 | 9/2018 | Akiba et al. |
| 2019/0106352 A1 | 4/2019 | Nojima et al. |
| 2020/0325063 A1* | 10/2020 | Amma ............... C03C 4/02 |
| 2020/0326063 A1 | 10/2020 | Duckworth et al. |

FOREIGN PATENT DOCUMENTS

| | | |
|---|---|---|
| FR | 1547989 A | 11/1968 |
| FR | 2395961 A1 | 1/1979 |
| GB | 1060393 A | 3/1967 |
| GB | 1204187 A | 9/1970 |
| JP | 55-126549 A | 9/1980 |
| JP | 58-046459 A | 3/1983 |
| JP | 59-050048 A | 3/1984 |
| JP | 61-151035 A | 7/1986 |
| JP | 02-030640 A | 2/1990 |
| JP | 2001-342035 A | 12/2001 |
| JP | 2002-087841 A | 3/2002 |
| JP | 2009-203134 A | 9/2009 |
| JP | 4928607 B2 | 5/2012 |
| JP | 5969442 B2 | 8/2016 |
| JP | 2019-064898 A | 4/2019 |
| JP | 2019-112242 A | 7/2019 |
| KR | 10-2019-0030800 A | 3/2019 |
| RU | 2089519 C1 | 9/1997 |
| SU | 352853 A1 | 10/1972 |
| SU | 600102 A1 | 3/1978 |
| SU | 984999 A1 | 12/1982 |
| WO | 2001/072650 A1 | 10/2001 |
| WO | 2006/075785 A2 | 7/2006 |
| WO | 2008/028341 A1 | 3/2008 |
| WO | 2010/038597 A1 | 4/2010 |
| WO | 2012/133421 A1 | 10/2012 |
| WO | 2016/067921 A1 | 5/2016 |
| WO | 2019/151316 A1 | 8/2019 |
| WO | 2019/151321 A1 | 8/2019 |
| WO | 2020/114255 A1 | 6/2020 |

OTHER PUBLICATIONS

Chaliha et al., "Luminescence and dielectric properties of nanostructured $Eu^{3+}$:$K_2O$—$Nb_2O_5$—$SiO_2$ glass-ceramics", Solid State Sci., 2009, vol. 11, No. 8, pp. 1325-1332.

Chaliha et al., "Structure, dielectric and optical properties of transparent $Nd^{3+}$ $KNbO_3$ nanocrystalline glass-ceramics", Optical Materials, 2010, vol. 32, No. 9, pp. 1202-1209.

Chalihaa et al., "Optical and dielectric properties of isothermally crystallized nano-$KNbO_3$ in $Er^{3+}$-doped $K_2O$—$Nb_2O_5$—$SiO_2$ glasses", Spectrochimica Acta, 2010, vol. A75, No. 1, pp. 243-250.

Cleek et al., "Properties of barium titanium silicates", J.Res.Nat. Bur.Stand., 1956, vol. 57, No. 6, pp. 317-323.

Huanxin et al., "Properties and structure of niobosilicate glasses", Journal of Non-Crystalline Solids, vol. 112, Issues 1-3, Oct. 1989, pp. 332-335.

Shelby et al., "Potassium niobium siliciate glasses", Phys.Chem. Glasses, 1994, vol. 35, No. 4, pp. 153-159.

Shelby et al., "Yttrium gallosilicate glasses", Phys.Chem.Glasses, 1990, vol. 31, No. 2, pp. 49-53.

Srikumar et al., "Emission features of $Ho^{3+}$ ion in $Nb_2O_5$, $Ta_2O_5$ and $La_2O_3$ mixed $Li_2O$—$ZrO_2$—$SiO_2$ glasses", Physica B, 2011, vol. 406, No. 19, pp. 3592-3598.

* cited by examiner

GLASS COMPOSITIONS WITH HIGH REFRACTIVE INDEXES AND LOW DENSITIES

This application claims priority under 35 USC § 119(e) from U.S. Provisional Patent Application Ser. No. 63/026,309 filed on May 18, 2020 which is incorporated by reference herein in its entirety.

FIELD

The present disclosure generally relates to glass compositions with high refractive indexes and low densities, particularly glass compositions with high refractive indexes and low densities suitable for use in optical displays.

BACKGROUND

In the recent decade, the demand of optical glass with high refractive indexes has increased with the growing market in augmented reality and virtual reality devices. A relatively high refractive index creates less distortions for users of the devices compared to a relatively lower refractive index, thus providing a better viewing experience. Another requirement for optical glass used in augmented reality and virtual reality devices is low density. As such devices are made to be wearable, the weight of the device is held by a user. Over an extended period of time, even a relatively lightweight device can become cumbersome for a user to wear.

SUMMARY

Thus, lightweight, low-density glasses are desirable for use as optical glasses in augmented reality or virtual reality devices. Additional requirements for optical glasses used in augmented reality or virtual reality devices include good transmittance in visible range, good glass formability, chemical durability, and relatively low production cost. For example, the optical glasses should have good chemical durability in order to withstand cleaning applications and various environmental conditions.

Traditionally, it has been difficult to create optical glass with a high refractive index and low density while maintaining the desirable combination of other chemical and mechanical properties. Previous attempts to increase the refractive index of glass caused the density to also increase, thus creating glass that was heavy and difficult for a user to wear in an augmented reality or virtual reality device. Other attempts to increase the refractive index while maintaining a low density caused significant coloring and darkening of the glass, which prevented the glass from being used in augmented reality or virtual reality devices.

The embodiments disclosed herein provide glass compositions with high refractive index and low density, while still maintaining the combination of desirable chemical and mechanical properties needed for optical glass. For example, the glass compositions may be suitable for use in augmented reality or virtual reality devices, or for other optical components such as optical fibers, optical lenses, eyeglasses, camera lenses, and laser glasses. The glass compositions disclosed herein have good transmittance in visible range, good glass formability, good chemical durability, and relatively low production cost.

According to an aspect of the present disclosure a glass composition comprising a content of $SiO_2$ that is greater than or equal to about 44.0 mol. % and less than or equal to about 60.0 mol. % and a content of ZnO that is less than or equal to about 1.0 mol. %. The glass composition is also essentially free of Pb and Bi. Additionally, the glass composition has a refractive index greater than or equal to 1.75 and a density at room temperature that is less than or equal to about 4.5 $g/cm^3$.

According to another aspect of the present disclosure a glass composition comprising a content of about $SiO_2$ that is greater than or equal to about 35.0 mol. % and less than or equal to about 60.0 mol. %, and wherein the glass composition satisfies the following condition: refractive index−1.42−0.10×density ($g/cm^3$)>0.00.

According to another aspect of the present disclosure a glass composition comprising a content of about $SiO_2$ that is greater than or equal to about 35.0 mol. % and less than or equal to about 60.0 mol. %, and wherein the glass composition satisfies the following condition: refractive index−2.21+0.0086×$SiO_2$ (mol. %)>0.00.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
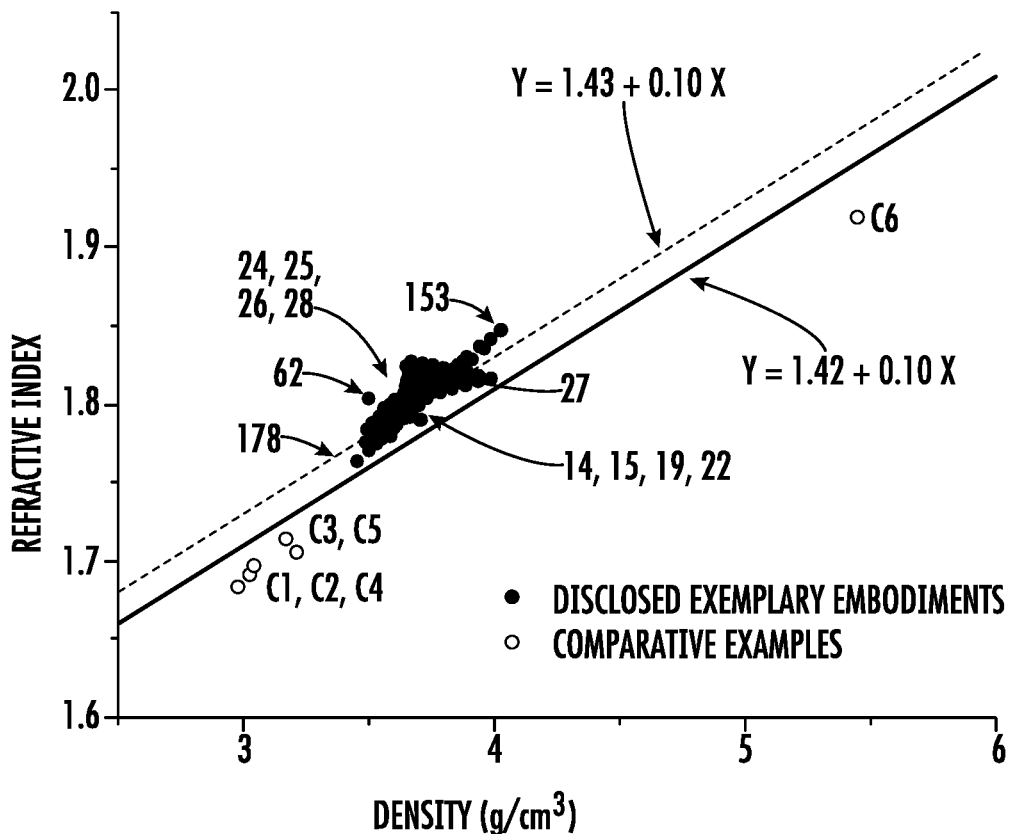
FIG. 1A is a plot of predicted values of density and refractive index for glass compositions according to embodiments of the present disclosure and for comparative examples.

Additional features and advantages of the disclosure will be set forth in the detailed description which follows and will be apparent to those skilled in the art from the description, or recognized by practicing the disclosure as described in the following description, together with the claims and appended drawings.

Modifications of the disclosure will occur to those skilled in the art and to those who make or use the disclosure. Therefore, it is understood that the embodiments shown in the drawings and described below are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "liquidus temperature" refers to the temperature above which the glass composition is completely liquid with no crystallization of constituent components of the glass.

The term "liquidus viscosity" refers to the viscosity of the glass composition at the liquidus temperature of the glass composition.

In the embodiments of the glass compositions described herein, the concentrations of constituent components (e.g., $SiO_2$, $Al_2O_3$, and the like) are specified in mole percent (mol. %) on an oxide basis, unless otherwise specified. Mole percent of a constituent in the glass composition refers to the number of moles of the constituent per unit mole of the glass composition times 100.

The term "monovalent metal oxide", as used herein, refers to an oxide of a metal having one of typical valencies equal to one, i.e., one of the following: $Li_2O$, $Na_2O$, $K_2O$, $Rb_2O$, $Cs2O$, $Ag_2O$, $Cu_2O$, $Au_2O$, or $Tl_2O$.

The term "divalent metal oxide", as used herein, refers to an oxide of a metal having one of typical valencies equal to two, i.e., one of the following: BeO, MgO, CaO, SrO, BaO, MnO, FeO, CoO, NiO, CuO, ZnO, PdO, CdO, SnO, EuO, PtO, HgO, or PbO.

The term "refractive index", or "RI", or $n_d$, as used herein, unless otherwise specified, refers to the refractive index of a glass composition for the yellow d-line of helium at about 587.6 nm measured at room temperature. When comparing the values of the refractive index of exemplary glasses presented in the embodiments herein with the published data from the prior art, the data for similar wavelengths, such as 589.3 nm (D-line), were also partly used in the case when the value of RI at 587.6 nm was not reported. The term $n_f$ refers to the refractive index of a glass composition at about 486.13 nm, and the term $n_c$ reference to the refractive index of a glass composition at about 656.27 nm. The refractive indexes disclosed herein may be measured or may be predicted using mathematical computations.

The term "glass transition temperature", or $T_g$, as used herein, refers to the onset temperature of an endothermic effect observed on a differential scanning calorimetric (DSC) test when heating a glass sample with the rate of approximately 10 K/min. Prior to make tests, the glasses were melted and then cooled in air.

The term "crystallization onset temperature", or $T_x$, as used herein, refers to the onset temperature of an exothermic effect of crystallization observed on a differential scanning calorimetric (DSC) test when heating a glass sample with the rate of approximately 10 K/min. Prior to make tests, the glasses were melted and then cooled in air. The difference $(T_x-T_g)$, expressed in ° C., is used as a quantitative estimate of the ability of a glass composition to protect from devitrification when reheating.

The terms "free" and "essentially free," when used to describe the concentration and/or absence of a particular constituent component in a glass composition, means that the constituent component is not intentionally added to the glass composition. However, the glass composition may contain traces of the constituent component as a contaminant or tramp. The term "tramp," when used to describe a particular constituent component in a glass composition, refers to a constituent component that is not intentionally added to the glass composition and is present in amounts less than 0.05 mol. %. Tramp components may be unintentionally added to the glass composition as an impurity in another constituent component or through migration of the tramp component into the composition during processing of the glass composition.

The glass compositions disclosed herein provide glass with a relatively high refractive index and a relatively low density. Refractive index determines the optical performance of a glass material. The higher the refractive index, the thinner an optical element (for example, a lens) may be formed at a specific focal length. Providing a thinner optical element while maintaining the focal length provides less distortions of an image viewed when using the glass. Such may be important when using the glass in, for example, an augmented reality or virtual reality device.

A lightweight glass is also important when using the glass in, for example, an augmented reality or virtual reality device. Such devices are worn by a user so that any weight contributes to a user's comfort when using the device. Weight is a function of size and density of a material. Accordingly, the higher the refractive index of a glass, the thinner the glass may be, thus providing a smaller size. Furthermore, materials with relatively lower densities are also relatively lighter.

Accordingly, glass compositions with high refractive indexes and low densities are beneficial for use in wearable devices, such as augmented reality devices or virtual reality devices. However, typically there is a strong correlation between these two properties. When refractive index is high, density is also high and when refractive index is low, density is also low, thus making it conventionally difficult to produce a glass with a low density while maintaining a high refractive index.

The disclosed embodiments provided herein provide a unique combination of constituents to create a glass composition having a high refractive index and low density. For example, and as discussed further below, the glass compositions disclosed herein may have a refractive index of 1.75 or greater and a density of 4.5 g/cm³ or less (at room temperature). A description of the constituents is provided below.

Silica ($SiO_2$)

Silica is a main glass former constituent of the glass composition. It provides a structural network of silicon and oxygen atoms that raises the viscosity of a glass forming melt and, therefore, prevents crystallization when cooling. Thus, silica is a required component of the glass compositions disclosed herein.

The incorporation of silica in the glass composition provides a low density glass. However, silica decreases the refractive index of the glass. Pure silica has a refractive index of 1.46, which is much lower than that required for high-performance optical systems, such as augmented reality and virtual reality devices. Therefore, the lower the content of silica, the easier it is to achieve a high refractive index. However, at too low of a silica content, the glass composition will not have good manufacturing properties such as good glass formation, homogeneity (i.e., the absence of phase separation), protection from devitrification when reheated, and high chemical durability.

Accordingly, the disclosed embodiments have a silica content greater than or equal to about 30.0 mol. %, or greater than or equal to about 35.0 mol. %, or greater than or equal to about 37.0 mol. %, or greater than or equal to about 40.0 mol. %, or greater than or equal to about 45.0 mol. %, or greater than or equal to about 48.0 mol. %, or greater than or equal to about 50.0 mol. %, or greater than or equal to about 55.0 mol. %. Additionally or alternatively, the silica content is less than or equal to about 60.0 mol. %, or less than or equal to about 57.0 mol. %, or less than or equal to about 55.0 mol. %, or less than or equal to about 50.0 mol. %, or less than or equal to about 48.0 mol. %. The lower and upper boundaries of the silica content is determined by the need to obtain a high refractive index (for example, 1.75 or greater) while still providing a glass composition with good manufacturing properties.

In some embodiments, the silica content is greater than or equal to about 44.0 mol. % and less than or equal to about 60.0 mol. %, or greater than or equal to about 45.0 mol. % and less than or equal to about 55 mol. %, or greater than or equal to about 40.0 mol. % and less than or equal to about 55.0 mol. %, or greater than or equal to about 35.0 mol. % and less than or equal to about 60.0 mol. %, or greater than or equal to about 30.0 mol. % and less than or equal to about 55.0 mol. %, or greater than or equal to about 30.0 mol. % and less than or equal to about 54.0 mol. %.

Titania ($TiO_2$)

Titania may be added to glass compositions to increase the refractive index. However, the incorporation of titania at high enough concentrations introduces a dark color to the glass, thus rendering the glass unsuitable for use in optical devices. Furthermore, high concentrations of titania may stimulate crystallization and/or phase separation in the glass. Thus, the content of titania is greater than or equal to about 0.0 mol. % and less than or equal to about 20.0 mol. %, or greater than or equal to about 1.0 mol. % and less than or equal to about 20.0 mol. %, or greater than or equal to about 0.0 mol. % and less than or equal to about 15.0 mol. %, or greater than or equal to about 0.0 mol. % and less than or equal to about 10.0 mol. %, or greater than or equal to about 0.0 mol. % and less than or equal to about 5.0 mol. %, or greater than or equal to about 1.0 mol. % and less than or equal to about 18.0 mol. %, or greater than or equal to about 2.0 mol. % and less than or equal to about 18.0 mol. % or greater than or equal to about 4.0 mol. % and less than or equal to about 16.0 mol. %, or greater than or equal to about 6.0 mol. % and less than or equal to about 14.0 mol. %, or greater than or equal to about 8.0 mol. % and less than or equal to about 12.0 mol. %.

Niobia ($Nb_2O_5$)

Niobia may also be added to the glass compositions disclosed herein to increase the refractive index. However, the incorporation of niobia at a high enough concentration stimulates crystallization and/or phase separation in the glass. Therefore, the content of niobia is greater than or equal to about 5.0 mol. % and less than or equal to about 25.0 mol. %. When the content of $Nb_2O_5$ is greater than or equal to about 5.0 mol. %, the glass composition is able to obtain a high refractive index (such as about 1.75 or more) at a relatively low density (such as about 4.0 g/cm³ or less). Furthermore, when the content of niobia is less than or equal to about 25.0 mol. %, the glass composition has sufficient glassforming properties (i.e. the glass melt does not crystallize when manufacturing the glass articles).

The content of niobia is preferably greater than or equal to about 5.0 mol. % and less than or equal to about 23.0 mol. %, or greater than or equal to about 10.0 mol. % and less than or equal to about 23.0 mol. %, or greater than or equal to about 6.0 mol. % and less than or equal to about 20.0 mol. %, or greater than or equal to about 8.0 mol. % and less than or equal to about 18.0 mol. %.

In other embodiments, the content of niobia is greater than or equal to 0.0 mol. %. Thus, in these embodiments, niobia may not be added to the glass composition and the above-described properties are maintained by other components of the glass compositions.

Zirconia ($ZrO_2$)

Similar to niobia, zirconia also raises the refractive index of a glass. However, zirconia further increases the viscosity of a glassforming melt, which may be undesirable or desirable depending on the particular composition and application of a glass. For example, if a glass composition comprises a high enough concentration of silica ($SiO_2$), alumina ($Al_2O_3$), and other viscosity-raising species, the viscosity of the glass may already be high. Therefore, further increasing the viscosity with the incorporation of zirconia may render the glass composition with an unusably high glass transition temperature. However, if the viscosity of a glass composition is insufficient (e.g., if the viscosity at liquidus temperature is low, which may stimulate devitrification of the glass), addition of zirconia may be desirable. It is also noted that the addition of zirconia to a glass composition at a high enough concentration may stimulate crystallization itself.

The content of zirconia is greater than or equal to about 0.0 mol. % and less than or equal to about 20.0 mol. %, or greater than or equal to about 0.0 mol. % and less than or equal to about 15.0 mol. %, or greater than or equal to about 0.0 mol. % and less than or equal to about 10.0 mol. %, or greater than or equal to about 0.0 mol. % and less than or equal to about 9.0 mol. %, or greater than or equal to about 0.0 mol. % and less than or equal to about 8.0 mol. %. or greater than or equal to about 0.0 mol. % and less than or equal to about 7.5 mol. %. or greater than or equal to about 0.0 mol. % and less than or equal to about 6.5 mol. %. At these disclosed ranges, zirconia not only raises the refractive index of the glass composition without significantly increasing the density, but also brings a good glassforming ability and reduces the coefficient of thermal expansion of the glass, preventing it from formation of high thermal stresses when cooling the glass articles.

Rare Earth Metal Oxides

The incorporation of rare earth metal oxides in the glass composition also increases the refractive index of the resulting glass. In addition, it may advantageously increase the modulus, stiffness, and/or liquidus viscosity of the resulting glass. For purposes of this disclosure, rare earth metals comprise the metals listed in the Lanthanide Series of the IUPAC Periodic Table with the addition of yttrium and scandium. In order to avoid adding color to the glass, preferred rare earth metal oxides include lanthanum oxide ($La_2O_3$), yttrium oxide ($Y_2O_3$), gadolinium oxide ($Gd_2O_3$), ytterbium oxide ($Yb_2O_3$), lutelium oxide ($Lu_2O_3$), cerium oxide ($Ce_2O_3$), praseodymium oxide ($Pr_2O_3$), neodymium oxide ($Nd_2O_3$), samarium oxide ($Sm_2O_3$), europium oxide ($Eu_2O_3$), terbium oxide ($Tb_2O_3$), dysprosium oxide ($Dy_2O_3$), holmium oxide ($Ho_2O_3$), erbium oxide ($Er_2O_3$), thulium oxide ($Tm_2O_3$), or combinations thereof. In terms of cost-savings, lanthanum oxide ($La_2O_3$) is a relatively cheap rare earth metal oxide. Neodymium oxide ($Nd_2O_3$) and europium oxide ($Eu_2O_3$), for example, may be especially useful in glass compositions disclosed herein for use in laser optics to obtain fluorescence or phosphorescence effects.

The total content of the rare earth metal oxides is greater than or equal to about 0.0 mol. % and less than or equal to about 25.0 mol. %, or less than or equal to about 20.0 mol. %, or less than or equal to about 15.0 mol. %, or than or equal to about 10.0 mol. %, or less than or equal to about 5.0 mol. %, or greater than or equal to about 5.0 mol. % and less than or equal to about 20.0 mol. %.

In some embodiments, lanthanum oxide ($La_2O_3$) is used in the glass concentration at a concentration of greater than or equal to about 0.0 mol. % and less than or equal to about 16.0 mol. %, or less than or equal to about 12.0 mol. %, or less than or equal to about 10.0 mol. %, or less than or equal to about 8.0 mol. %, or less than or equal to about 6.0 mol. %, or less than or equal to about 4.0 mol. %, or less than or equal to about 2.0 mol. %, or less than or equal to about 1.0 mol. %. At higher concentrations of $La_2O_3$ than those disclosed herein, the glassforming ability of the glass may decrease and/or the glass may have undesirable coloring (darkening).

Additional Refractive Index Raising Components

The glass compositions disclosed herein may additionally comprise one or more other refractive index raising components. For example, the glass compositions may comprise, molybdenum oxide ($MoO_3$), tungsten oxide ($WO_3$), tin oxide (SnO), or combinations thereof. The total content of these additional refractive index raising components is less than or equal to about 10.0 mol. %, or less than or equal to about 7.0 mol. %, or less than or equal to about 5.0 mol. %

Modifiers

One or more modifiers may be added to the glass compositions disclosed herein to change the structure of the glass. For example, most of the refractive index raising components discussed above have limited solubility in a silicate glassforming melt. Therefore, in order to increase their solubility in the glass composition (and to prevent devitrification of melt) one or more modifiers may be added to the glass composition. The modifiers change the structure of the glass and allow the refractive index raising components to be a part of the glassforming network.

Examples of modifiers include the oxides of monovalent metals and/or the oxides of divalent metals. The oxides of monovalent metals include alkali metal oxides such as lithium oxide ($Li_2O$), sodium oxide ($Na_2O$), potassium oxide ($K_2O$), rubidium oxide ($Rb_2O$), and/or caesium oxide ($Cs_2O$). Lithium oxide ($Li_2O$) may be beneficial in a glass composition when the lightweight requirement is especially important. In some embodiments, a mixture of two or more alkali metal oxides may be used, especially when the highest refractive index is required.

Additional oxides of monovalent metals include, for example, silver oxide ($Ag_2O$), copper oxide ($Cu_2O$), and/or thallium oxides ($Tl_2O$). For example, silver oxide may be used to also provide a bactericide effect.

The total content of monovalent metal oxides is greater than or equal to about 0.0 mol. % and less than or equal to about 25.0 mol. %, or less than or equal to about 20.0 mol. %, or less than or equal to about 15.0 mol. %, or less than or equal to about 10.0 mol. %, or less than or equal to about 5.0 mol. %, or greater than or equal to about 1.0 mol. % and less than or equal to about 20.0 mol. %, or greater than or equal to about 1.0 mol. % and less than or equal to about 15.0 mol. %, or greater than or equal to about 2.0 mol. % and less than or equal to about 10.0 mol. %.

In some embodiments, the content of lithium oxide ($Li_2O$) is greater than or about 0.0 mol. % and less than or equal to about 15.0 mol. %, or less than or equal to about 10.0 mol. %, or less than or equal to about 5.0 mol. %. Additionally or alternatively, the content of sodium oxide ($Na_2O$) is greater than or equal to about 0.0 mol. % and less than or equal to about 20.0 mol. %, or less than or equal to about 15.0 mol. % or less than or equal to about 10.0 mol. % or less than or equal to about 5.0 mol. %. Additionally or alternatively, the content of potassium oxide ($K_2O$) is greater than or equal to about 0.0 mol. % and less than or equal to about 15.0 mol. %, or less than or equal to about 10.0 mol. %, or less than or equal to about 5.0 mol. %.

The oxides of divalent metals include zinc oxide (ZnO), alkaline earth metal oxides such as beryllium oxide (BeO), magnesium oxide (MgO), calcium oxide (CaO), strontium oxide (SrO), and/or barium oxide (BaO), and other species enumerated above.

In some embodiments, at least one divalent metal oxide is a required component in the glass composition in order to accommodate the refractive index raising components. The total content of divalent metal oxides in the glass compositions disclosed herein is greater than or equal to about 1.0 mol. % and less than or equal to about 30.0 mol. %, or greater than or equal to about 1.0 mol. % and less than or equal to about 28.0 mol. %, or greater than or equal to about 1.0 mol. % and less than or equal to about 25.0 mol. %, or greater than or equal to about 1.0 mol. % and less than or equal to about 20.0 mol. %, or greater than or equal to about 1.0 mol. % and less than or equal to about 18.0 mol. %, or greater than or equal to about 1.0 mol. % and less than or equal to about 15.0 mol. %, or greater than or equal to about 1.0 mol. % and less than or equal to about 5.0 mol. %, or greater than or equal to about 1.5 mol. % and less than or equal to about 18.0 mol. %, or greater than or equal to about 1.5 mol. % and less than or equal to about 15.0 mol %.

In some embodiments, the content of zinc oxide (ZnO) is less than or equal to about 20.0 mol. %, or less than or equal to about 15.0 mol. %, or less than or equal about 10.0 mol. %, or less than or equal to about 5.0 mol. %, or less than or equal to about 3.0 mol. %, or less than or equal to about 1.0 mol. %, or less than or equal to about 0.8 mol. %, or less than or equal to about 0.5 mol. %, or less than or equal to about 0.25 mol. %, or less than or equal to about 0.1 mol. %. Additionally or alternatively, the content of magnesium oxide (MgO) is greater than or equal to about 0.0 mol. % and less than or equal to about 20.0 mol. %, or less than or equal to about 15.0 mol. %, or less than or equal to about 10.0 mol. %, or less than or equal to about 5.0 mol. %. Additionally or alternatively, the content of calcium oxide (CaO) is greater than or equal to about 0.0 mol. % and less than or equal to about 20.0 mol. %, or less than or equal to about 15.0 mol. %, or less than or equal to about 10.0 mol. %, or less than or equal to about 5.0 mol. %. Additionally or alternatively, the content of strontium oxide (SrO) is greater than or equal to about 0.0 mol. % and less than or equal to about 20.0 mol. %, or less than or equal to about 15.0 mol. %, or less than or equal to about 10.0 mol. %, or less than or equal to about 5.0 mol. %. Additionally or alternatively, the content of barium oxide (BaO) is greater than or equal to about 0.0 mol. % and less than or equal to about 20.0 mol. %, or less than or equal to about 15.0 mol. %, or less than or equal to about 10.0 mol. %, or less than or equal to about 5.0 mol. %.

In some embodiments, the glass compositions disclosed herein comprise both monovalent metal oxides and divalent metal oxides. The inclusion of both oxides widen the glass-forming area, thus increasing the amount of refractive index raising constituents without needing to add more modifiers. When high concentrations of both the monovalent and divalent metal oxides are included, they may work opposite each other, thus reducing their individual effects. Therefore, in some embodiments, the total content of both the monovalent and divalent metal oxides is greater than or equal to about 1.0 mol. % and less than or equal to about 35.0 mol. %, or greater than or equal to about 1.0 mol. % and less than or equal to about 33.0 mol. %, or greater than or equal to about 1.0 mol. % and less than or equal to about 30.0 mol. %, or greater than or equal to about 1.0 mol. % and less than or equal to about 25.0 mol. %, or greater than or equal to about 1.0 mol. % and less than or equal to about 20.0 mol. %, or greater than or equal to about 1.0 mol. % and less than or equal to about 15.0 mol. %.

Limited Components

Some components such as, for example, iron (Fe), chromium (Cr), copper (Cu), vanadium (V), molybdenum (Mo), and cobalt (Co) impart dark color to glass, thus rendering the glass non-transparent. Accordingly, the content of these components in the glass compositions disclosed herein should be limited to small values, such as less than about 1.0 mol. %, or less than about 0.5 mol. %, or less than about 0.2 mol. %, or less than about 0.1 mol. %, or less than about 0.05 mol. %, or less than about 0.005 mol. %. In some embodiments, the glass compositions disclosed herein are free or essentially free of these components.

It is also contemplated that the glass compositions disclosed herein are free or essentially free of lead (Pb), bismuth (Bi), tantalum (Ta), and/or fluorine (F) (including their oxides: PbO, $PbO_2$, $Bi_2O_3$, $Bi_2O_5$, $Ta_2O_5$). These components are very heavy such that their inclusion should be avoided in order to provide a low density glass composition. Therefore, the content of these components in some embodiments is 0.0 mol. %. However, it is also contemplated in other embodiments to include small amounts of these components such as, for example, less than about 1.0 mol. %, or less than about 0.5 mol. %, or less than about 0.2 mol. %, or less than about 0.1 mol. %, or less than about 0.05 mol. %, or less than about 0.005 mol. %. When the requirements of density are met by the other components in the glass composition, the compositions disclosed herein may comprise small amounts of Pb, Bi, Ta, and/or F. Among these species, the most suitable is tantalum oxide ($Ta_2O_5$), which may be added in the glass compositions in a higher content, such as, for example, less than or equal to about 2.0 mol. %, or less than or equal to about 3.0 mol. %, or less than or equal to about 4.0 mol. %, or less than or equal to about 5.0 mol. %.

Other components to limit/avoid include aluminum oxide ($Al_2O_3$), boron oxide ($B_2O_3$), and/or phosphorus oxide ($P_2O_5$). These components provide a low refractive index, and thus should be limited and/or avoided. For example, the content of each of aluminum oxide ($Al_2O_3$), boron oxide ($B_2O_3$), and phosphorus oxide ($P_2O_5$) in the glass compositions disclosed herein is less than or equal to about 1.0 mol. %, or less than about 0.5 mol. %, or less than about 0.2 mol. %, or less than or equal to about 0.1 mol. %, or less than about 0.05 mol. %, or less than about 0.005 mol. %. In some embodiments, the glass composition is free or essentially free of these components. Among these species, the most suitable is boron oxide ($B_2O_3$) that may, in some embodiments, be added to the glass compositions in an amount that does not reduce the refractive index below the required values, e.g., less than or equal to about 2.0 mol. %, or less than or equal to about 3.0 mol. %, or less than or equal to about 5.0 mol. %, or, sometimes, even less than or equal to about 10.0 mol. %.

Oxides of some other elements, such as, for example, arsenic (As) antimony (Sb), may also be added in small concentrations in the glass compositions as refining agents; however, these species are not ecological and, therefore, should be avoided where possible.

Properties

As discussed above, the glass compositions disclosed herein have a high refractive index and a low density. The refractive index is greater than or equal to 1.70, or greater than or equal to 1.75, or greater than or equal to 1.76, or greater than or equal to 1.77, or greater than or equal to 1.78, or greater than or equal to 1.79, or greater than or equal to 1.80, or greater than or equal to 1.81, or greater than or equal to 1.82, or greater than or equal to 1.83, or greater than or equal to 1.84, or greater than or equal to 1.85. In some embodiments, the refractive index is greater than or equal to 1.75 and less than or equal to 1.90, or greater than or equal to 1.76 and less than or equal to 1.87, or greater than or equal to 1.77 and less than or equal to 1.85.

The density of the glass compositions of the present disclosure is less than or equal to about 5.0 $g/cm^3$, or less than or equal to about 4.7 $g/cm^3$, or less than or equal to about 4.5 $g/cm^3$, or less than or equal to about 4.3 $g/cm^3$, or less than or equal to about 4.0 $g/cm^3$, or less than or equal to about 3.7 $g/cm^3$, or less than or equal to about 3.5 $g/cm^3$, or less than or equal to about 3.3 $g/cm^3$.

The glass compositions of the present disclosure provide optical glasses having a high transmittance in the visible range. Furthermore, the optical glasses have a relatively high percent of silica, this improving chemical durability and ease of manufacturing. The optical glasses also have a relatively high difference between crystallization onset temperature ($T_x$) and glass transition temperature ($T_g$) so that 130° C. ($T_x$–$T_g$) 190° C., thus preventing a glass article from devitrification when reheated.

Exemplary Examples

Provided below are exemplary embodiments of glass compositions of the present disclosure. However, this disclosure is not limited to the examples and embodiments provided herein.

Exemplary glass compositions according to the present disclosure are shown below in Tables 1-5, which identify the combination of components and their respective amounts (with some amounts being shown in ranges), according to the present disclosure. The glass compositions in Tables 1-5 may include additional components according to aspects of the present disclosure as described herein.

The glass compositions listed in Tables 1-5 below were prepared by conventional glass forming methods. These glasses were made from batches (e.g., glass melts of 5 to 2000 g 100% theoretical yield; typical yields were about 90 wt % due to, e.g., adherence of the glass melt to the walls of the crucible) of source or starting materials including, for example, $SiO_2$ (MinTec, 99.999%), $Li_2CO_3$ (ChemPoint (FMC)), $Na_2CO_3$ (Fisher Scientific, 99.99%), $CaCO_3$ (Fisher Scientific, 99.9%), $BaCO_3$ (AMREX Chemical), ZnO (Zochem Inc. Distributor: Meyers Chemical Inc.), $ZrO_2$ (MEL Chemicals PRC), $TiO_2$ (Harry W Gaffney, 99.68%), $La_2O_3$ (MolyCorp), $Nb_2O_5$ (Alfa Aesar), $SnO_2$ (Endeka Ceramics) that are melted in Pt crucibles at from 1350° C. to 1500° C. in air with or without an aluminum cover for 1 to 6 hours. The glasses were then cooled in air or poured onto a steel plate. Some of obtained samples of few mm thickness annealed for 1-5 hours. Each of the glass samples were tested for the refractive index and density.

TABLE 1

Exemplary Glass Compositions

| Oxides | Minimum (mol. %) | Maximum (mol. %) |
| --- | --- | --- |
| $SiO_2$ | 45 | 57 |
| $SiO_2 + Al_2O_3 + B_2O_3$ | 45 | 60 |
| $Nb_2O_5$ | 5 | 23 |
| $TiO_2$ | 0 | 20 |
| $Nb_2O_5 + TiO_2$ | 5 | 40 |
| $ZrO_2$ | 0 | 6.5 |
| $La_2O_3$ | 0 | 16 |
| $Li_2O + Na_2O + K_2O$ | 1 | 20 |
| $MgO + CaO + SrO + BaO + ZnO$ | 1 | 30 |
| $B_2O_3$ | 0 | 1 |
| $TiO_2$ | 1 | 20 |
| $Li_2O$ | 0 | 1 |
| $Bi_2O_3$ | 0 | 5 |
| PbO | Not Added | |

The glass compositions of Table 1 were designed for maximum glassforming ability and chemical durability. Thus, compositions of this embodiment have a high content of $SiO_2$. To reach a high refractive index at this high content of $SiO_2$, the content of $ZrO_2$ is limited because at higher content of $ZrO_2$ the glass melts tend to crystallize. To prevent this effect, the glass compositions of this embodiment comprise a large amount of monovalent and divalent metal oxides, which may be as much as 48.0 mol. %. Additionally, the content of boron oxide is limited to 0.5 mol. % to maintain the high refractive index.

TABLE 2

Exemplary Glass Compositions

| Oxides | Minimum (mol. %) | Maximum (mol. %) |
| --- | --- | --- |
| $SiO_2$ | 35 | 60 |
| Monovalent metal oxides $R_2O$ | 1 | 39 |
| Divalent metal oxides RO | 1 | 39 |
| Total modifiers ($R_2O + RO$) | 2 | 40 |
| $TiO_2$ | 1 | 20 |
| $Nb_2O_5$ | 0 | 20 |

TABLE 2-continued

Exemplary Glass Compositions

| Oxides | Minimum (mol. %) | Maximum (mol. %) |
| --- | --- | --- |
| $Bi_2O_3$ | 0 | 10 |
| $Li_2O$ | 0 | 1 |
| Pb + F + Tl | Not Added | |
| Provisos | Min | Max |
| Predicted refractive Index | 1.7 | |

The glass compositions of Table 2 were designed for high refractive indices with a high content of $SiO_2$. Accordingly, the glass compositions belonging of this embodiment are characterized by a high content of silica and a high content of index raising components, such as $Nb_2O_5$, $TiO_2$ and $ZrO_2$. The total content of the index raising components may be as much as 58.0 mol. %.

TABLE 3

Exemplary Glass Compositions

| Oxides | Minimum (mol. %) | Maximum (mol. %) |
| --- | --- | --- |
| $SiO_2$ | 30 | 54 |
| $B_2O_3$ | 0 | 1 |
| $Nb_2O_5$ | 5 | 23 |
| $TiO_2$ | 0 | 20 |
| $ZrO_2$ | 0 | 6.5 |
| $Li_2O$ | 0 | 15 |
| $Li_2O + Na_2O + K_2O$ | 1 | 20 |
| $MgO + CaO + SrO + BaO$ | 1 | 15.5 |
| $Li_2O + Na_2O + K_2O + MgO + CaO + SrO + BaO$ | 0 | 33 |
| $PbO + Bi_2O_3 + Ta_2O_5$ | 0 | 1 |

The glass compositions of Table 3 were designed for high glassforming ability and ecology requirements. With regard to glassforming ability, the glass compositions comprise one or more alkali metal oxides with one or more alkaline earth metal oxides. To meet the ecology requirements, the glass compositions are substantially free or comprise very small amounts of lead oxide. To maintain a light weight, the glass compositions also comprise limited amounts of heavy components, such as $Bi_2O_3$ and $Ta_2O_5$. The content of $ZrO_2$ is also limited to prevent devitrification of the glass melts when cooling. The content of $B_2O_3$ is limited to 0.5 mol. % to maintain a high refractive index.

TABLE 4

Exemplary Glass Compositions

| Oxides | Minimum (mol. %) | Maximum (mol. %) |
| --- | --- | --- |
| $SiO_2$ | 45 | 65 |
| $Li_2O$ | 0 | 1 |
| Monovalent metal oxides $R_2O$ | 1 | 20 |
| Divalent metal oxides RO | 1 | 39 |
| Total modifiers ($R_2O + RO$) | 2 | 40 |
| $TiO_2$ | 1 | 19.5 |
| $Nb_2O_5$ | 0 | 20 |
| Pb + F | Not added | |

The glass compositions of Table 4 were designed to provide a high ratio between the refractive index and density along with high glassforming ability.

Figure 1B:
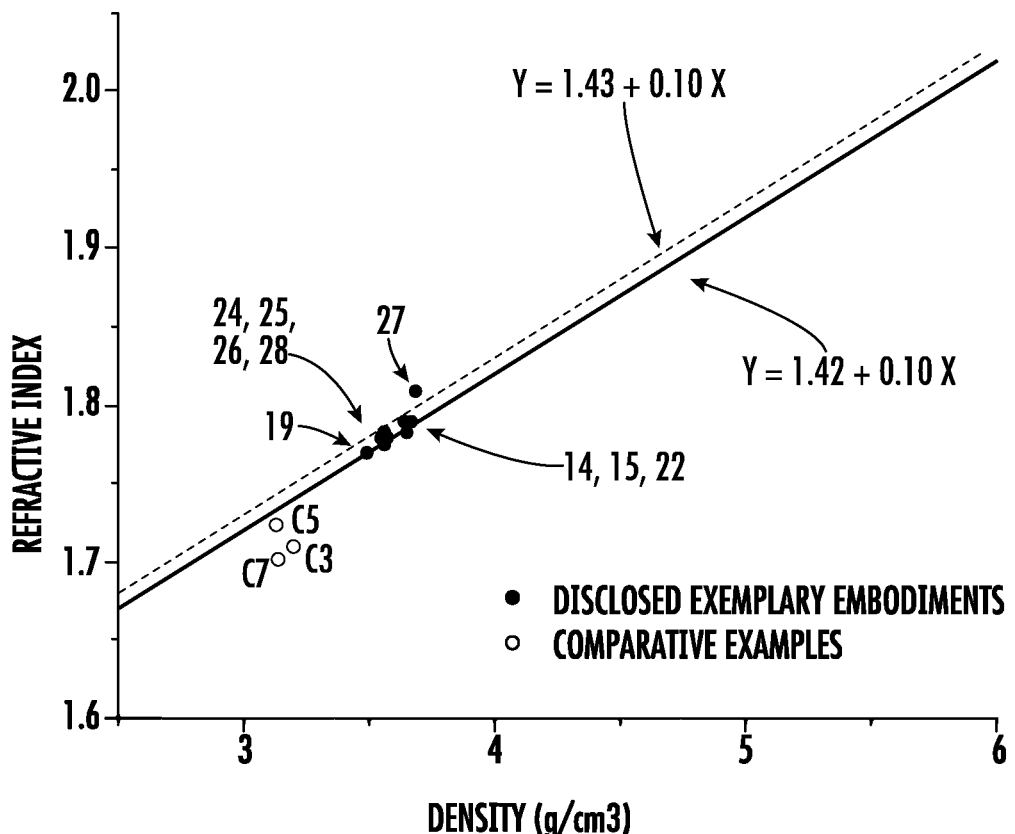
FIG. 1B is a plot of measured values of density and refractive index for glass compositions according to embodiments of the present disclosure and for comparative examples.
Figure 2A:
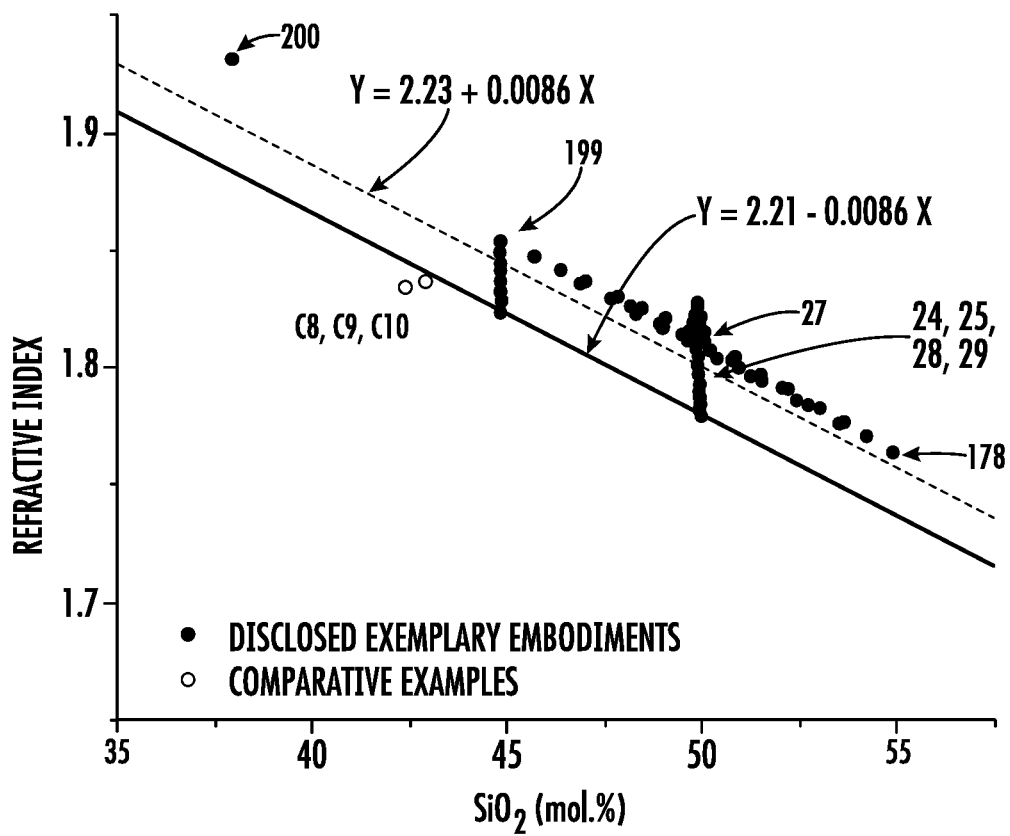
FIG. 2A is a plot of silica and predicted values of refractive index for glass compositions according to embodiments of the present disclosure and for comparative examples.
Figure 2B:
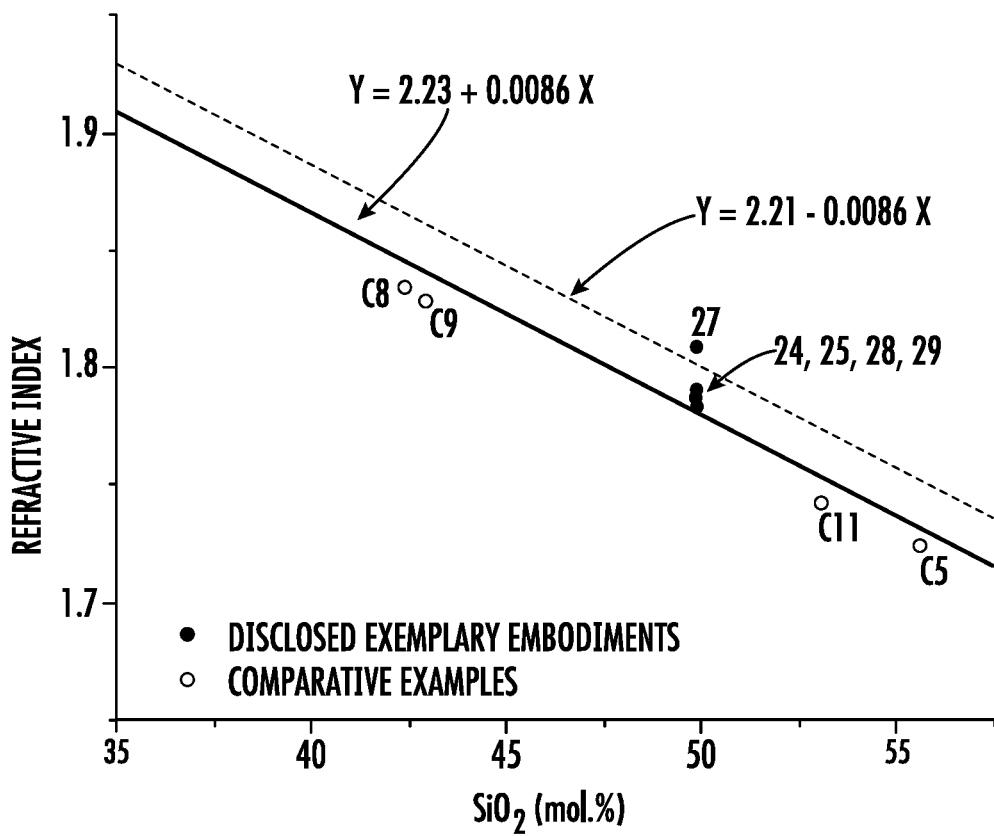
FIG. 2B is a plot of silica content and measured values of refractive index for glass compositions according to embodiments of the present disclosure and for comparative examples.

FIGS. 1A and 1B provide a comparison of the glass compositions in accordance with exemplary embodiments of the present disclosure and the comparative examples of the prior art in terms of density and refractive index. FIGS. 2A and 2B provide a comparison of the glass compositions in accordance with exemplary embodiments of the present disclosure and the comparative examples of the prior art in terms of silica content and refractive index. The specific glass compositions of FIGS. 1A-2B are provided in Tables 5 and 6 below. The density and refractive index values in FIGS. 1A and 2A are predicted values, and the refractive index values in FIGS. 1B and 2B are measured values.

All compositions presented in FIGS. 1A and 1B (both exemplary embodiments and comparative compositions) satisfy the conditions specified in Table 4.

All compositions presented in FIGS. 2A and 2B (both exemplary embodiments and comparative compositions) satisfy the conditions specified in Table 2.

As shown in FIG. 1A, the embodiments of the present disclosure achieve the combination of a lower density and a higher refractive index, as compared with the comparative examples. The exemplary embodiments of the present disclosure satisfy the following conditions (1) and (2) below, as also shown in FIG. 1A.

$$\text{Refractive Index}=1.42+0.10\times\text{Density (g/cm}^3) \quad (1)$$

$$\text{Refractive Index}-1.42-0.10\times\text{Density (g/cm}^3)>0.00 \quad (2)$$

However, the comparative examples of FIG. 1A do not satisfy the above conditions (1) and (2) and, instead, have densities and refractive indexes that fall below the plots of these conditions.

For example, exemplary example 24 has a density of 3.61 g/cm³ and a refractive index of 1.803. Exemplary example 25 has a density of 3.58 g/cm³ and a refractive index of 1.787. Exemplary example 27 has a density of 3.73 g/cm³ and a refractive index of 1.811. None of the comparative examples are able to achieve such a low density with such a high refractive index.

As discussed above and as shown in FIG. 1A, all of the exemplary embodiments satisfy conditions (1) and (2). Furthermore, some of the exemplary embodiments also satisfy conditions (3) and (4) below.

$$\text{Refractive Index}=1.43+0.10\times\text{Density (g/cm}^3) \quad (3)$$

$$\text{Refractive Index}-1.43-0.10\times\text{Density (g/cm}^3)>0.00 \quad (4)$$

FIG. 1B also shows a select number of examples of the exemplary embodiments and comparative examples with conditions (1)-(4).

As shown in FIG. 2A, the embodiments of the present disclosure achieve the combination of a sufficiently high silica content to provide good manufacturing properties (e.g., good glass formation, homogeneity, protection from devitrification when reheated, high chemical durability) while still maintaining a high refractive index, as compared with the comparative examples. The exemplary embodiments of the present disclosure satisfy the following conditions (5) and (6) below, as also shown in FIG. 2A.

$$\text{Refractive Index}=2.21-0.0086\times\text{SiO}_2 \text{ (mol. \%)} \quad (5)$$

$$\text{Refractive Index}-2.21+0.0086\times\text{SiO}_2 \text{ (mol. \%)}>0.00 \quad (6)$$

However, the comparative examples of FIG. 2A do not satisfy the above conditions (5) and (6) and, instead, have silica contents and refractive indexes that fall below the plots of these conditions.

For example, exemplary example 24 has a silica content of 49.89 mol. % and a refractive index of 1.803. Exemplary example 25 has a silica content of 49.92 mol. % and a refractive index of 1.787. Exemplary example 27 has a silica content of 49.87 mol. % and a refractive index of 1.811. None of the comparative examples are able to achieve such a high silica content with such a high refractive index.

As discussed above and as shown in FIG. 2A, all of the exemplary embodiments satisfy conditions (5) and (6). Furthermore, some of the exemplary embodiments also satisfy conditions (7) and (8) below.

$$\text{Refractive Index}=2.23-0.0086\times\text{SiO}_2 \text{ (mol. \%)} \quad (7)$$

$$\text{Refractive Index}-2.23+0.0086\times\text{SiO}_2 \text{ (mol. \%)}>0.00 \quad (8)$$

FIG. 2B also shows a select number of examples of the exemplary embodiments and comparative examples with conditions (5)-(8).

Table 5 below provides exemplary examples with measured and predicted values for refractive index and density. The predicted values are calculated based upon the following equations (9) and (10) below, wherein refractive index is provided in mol. % and density is provided in g/cm³.

$$\begin{aligned}\text{Refractive Index}=&1.66040-0.0019575\times\text{SiO}_2-\\&0.0012005\times\text{B}_2\text{O}_3+0.0097681\times\text{La}_2\text{O}_3+\\&0.0049583\times\text{TiO}_2+0.0016595\times\text{ZnO}+0.0045141\times\\&\text{ZrO}_2+0.0016435\times\text{CaO}+0.011459\times\text{Nb}_2\text{O}_5+\\&0.002465\times\text{BaO}+0.0045473\times\text{WO}_3+0.0088971\times\\&\text{Gd}_2\text{O}_3+0.0079032\times\text{Y}_2\text{O}_3+0.010713\times\text{Ta}_2\text{O}_5+\\&0.00011409\times\text{Li}_2\text{O}-0.002614\times\text{Al}_2\text{O}_3-\\&0.00068328\times\text{Na}_2\text{O}-0.00037904\times\text{GeO}_2+\\&0.0031546\times\text{SrO}+0.014493\times\text{Bi}_2\text{O}_3+0.0087809\times\\&\text{Yb}_2\text{O}_3-0.00096658\times\text{K}_2\text{O}+0.006201\times\text{PbO}\end{aligned} \quad (9)$$

$$\begin{aligned}\text{Density}=&3.25903-0.0098232\times\text{SiO}_2-0.0092217\times\\&\text{B}_2\text{O}_3+0.070094\times\text{La}_2\text{O}_3+0.0055203\times\text{TiO}_2+\\&0.015363\times\text{ZnO}+0.021612\times\text{ZrO}_2+0.0053681\times\\&\text{CaO}+0.031432\times\text{Nb}_2\text{O}_5+0.00093374\times\text{MgO}+\\&0.033533\times\text{BaO}+0.053049\times\text{WO}_3+0.10625\times\\&\text{Gd}_2\text{O}_3+0.047221\times\text{Y}_2\text{O}_3+0.097478\times\text{Ta}_2\text{O}_5-\\&0.0051458\times\text{Li}_2\text{O}-0.010310\times\text{Al}_2\text{O}_3-0.0027528\times\\&\text{Na}_2\text{O}+0.0034794\times\text{GeO}_2+0.027194\times\text{SrO}+\\&0.11606\times\text{Bi}_2\text{O}_3+0.11896\times\text{Yb}_2\text{O}_3-0.0081723\times\\&\text{K}_2\text{O}+0.062242\times\text{PbO}\end{aligned} \quad (10)$$

TABLE 5

Exemplary Glass Compositions

| | | Exemplary Example Number | | | | | | | | | |
|---|---|---|---|---|---|---|---|---|---|---|---|
| | | 1 | 2 | 3 | 4 | 5 | 6 | 7 | 8 | 9 | 10 |
| Component (Mol. %) | SiO$_2$ | 49.93 | 49.95 | 49.9 | 49.96 | 49.95 | 49.95 | 49.93 | 49.93 | 49.9 | 49.9 |
| | Nb$_2$O$_5$ | 14.98 | 14.99 | 14.98 | 14.99 | 14.99 | 14.99 | 14.98 | 14.98 | 14.97 | 14.97 |
| | BaO | 7.99 | 7.99 | 7.99 | 7.99 | 7.99 | 8 | 7.99 | 7.99 | 7.99 | 7.99 |
| | Na$_2$O | 14.74 | 12.39 | 12.26 | 9.99 | 7.63 | 5.3 | 0.75 | 8.36 | 8.32 | 6 |
| | TiO$_2$ | 2.99 | 3 | 3 | 3 | 3 | 3 | 3 | 2.99 | 2.99 | 3 |
| | ZrO$_2$ | 4.99 | 4.99 | 4.99 | 5 | 5 | 4.99 | 5 | 4.99 | 4.99 | 4.99 |
| | K$_2$O | 0.83 | 5.75 | 0.82 | 8.14 | 10.52 | 12.85 | 17.42 | 6.44 | 4.01 | 6.37 |
| | CaO | 3.4 | 0.86 | 5.9 | 0.84 | 0.83 | 0.84 | 0.83 | 4.17 | 6.64 | 6.59 |

TABLE 5-continued

| | | \multicolumn{10}{c}{Exemplary Glass Compositions} |
|---|---|---|---|---|---|---|---|---|---|---|---|
| | $La_2O_3$ | 0 | 0 | 0 | 0 | 0 | 0 | 0 | 0 | 0 | 0 |
| | $Y_2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.01 | 0.01 | 0.01 | 0.01 | 0.01 | 0.01 | 0.01 | 0.01 | 0.01 | 0.01 |
| | $Li_2O$ | 0 | 0 | 0 | 0 | 0 | 0 | 0 | 0 | 0 | 0 |
| | $Al_2O_3$ | 0.04 | 0.04 | 0.04 | 0.04 | 0.04 | 0.04 | 0.04 | 0.04 | 0.04 | 0.04 |
| | $WO_3$ | 0 | 0 | 0 | 0 | 0 | 0 | 0 | 0 | 0 | 0 |
| | MgO | 0.08 | 0.03 | 0.1 | 0.03 | 0.03 | 0.03 | 0.03 | 0.08 | 0.13 | 0.13 |
| | $CeO_2$ | 0 | 0 | 0 | 0 | 0 | 0 | 0 | 0 | 0 | 0 |
| | $Ta_2O_5$ | 0 | 0 | 0 | 0 | 0 | 0 | 0 | 0 | 0 | 0 |
| | $Fe_2O_3$ | 0.01 | 0.01 | 0.01 | 0.01 | 0.01 | 0.01 | 0.01 | 0.01 | 0.01 | 0.01 |
| Measured | D, g/cm³ | 3.648 | 3.535 | | | 3.59 | | 3.503 | | | |
| | $n_d$ | | | 1.7346 | 1.7546 | | 1.7496 | | 1.7546 | | |
| | $n_C$ | | | | | | | | | 3.631 | |
| | $n_F$ | | | | | | | | | | 3.634 |
| | An. Pt, °C. | | | | | | | | | | |
| | Strain P, °C. | | | | | | | | | | |
| Predicted | D, g/cm³ | 3.60 | 3.56 | 3.62 | 3.54 | 3.53 | 3.52 | 3.49 | 3.58 | 3.62 | 3.60 |
| | RI | 1.786 | 1.779 | 1.7792 | 1.778 | 1.777 | 1.777 | 1.776 | 1.786 | 1.793 | 1.792 |

| | | \multicolumn{10}{c}{Exemplary Example Number} |
|---|---|---|---|---|---|---|---|---|---|---|---|
| | | 11 | 12 | 13 | 14 | 15 | 16 | 17 | 18 | 19 | 20 |
| Component (Mol. %) | $SiO_2$ | 49.89 | 49.88 | 49.86 | 49.94 | 49.94 | 49.9 | 49.92 | 49.95 | 49.95 | 49.91 |
| | $Nb_2O_5$ | 14.96 | 14.96 | 14.96 | 14.98 | 14.98 | 14.97 | 14.98 | 14.98 | 14.98 | 14.97 |
| | BaO | 7.98 | 7.98 | 7.98 | 4.99 | 4.99 | 4.99 | 4.99 | 5 | 4.99 | 4.99 |
| | $Na_2O$ | 1.47 | 5.19 | 0.73 | 18 | 15.6 | 14.39 | 13.75 | 11.84 | 9.22 | 7.96 |
| | $TiO_2$ | 2.99 | 3 | 2.99 | 2.99 | 3 | 3 | 3 | 3 | 3 | 2.99 |
| | $ZrO_2$ | 4.99 | 4.99 | 4.98 | 7.99 | 7.99 | 7.98 | 7.99 | 7.99 | 7.99 | 7.98 |
| | K2O | 8.59 | 3.15 | 5.41 | 0.39 | 2.77 | 0.4 | 2.79 | 6.52 | 9.13 | 6.62 |
| | CaO | 8.91 | 10.6 | 12.81 | 0.6 | 0.6 | 4.2 | 2.43 | 0.61 | 0.63 | 4.39 |
| | $La_2O_3$ | 0 | 0 | 0 | 0 | 0 | 0 | 0 | 0 | 0 | 0 |
| | $Y2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.01 | 0.01 | 0.01 | 0.01 | 0.01 | 0.01 | 0.01 | 0.01 | 0.01 | 0.01 |
| | $Li_2O$ | 0 | 0 | 0 | 0 | 0 | 0 | 0 | 0 | 0 | 0 |
| | $Al2O_3$ | 0.04 | 0.04 | 0.04 | 0.05 | 0.05 | 0.05 | 0.05 | 0.04 | 0.04 | 0.05 |
| | $WO_3$ | 0 | 0 | 0 | 0 | 0 | 0 | 0 | 0 | 0 | 0 |
| | MgO | 0.16 | 0.18 | 0.21 | 0.05 | 0.05 | 0.1 | 0.08 | 0.05 | 0.05 | 0.1 |
| | $CeO_2$ | 0 | 0 | 0 | 0 | 0 | 0 | 0 | 0 | 0 | 0 |
| | $Ta_2O_5$ | 0 | 0 | 0 | 0 | 0 | 0 | 0 | 0 | 0 | 0 |
| | $Fe_2O_3$ | 0.01 | 0.01 | 0.01 | 0.01 | 0.01 | 0.01 | 0.01 | 0.01 | 0.01 | 0.01 |
| Measured | D, g/cm³ | | | 3.697 | 3.574 | 3.547 | | | | 3.494 | |
| | $n_d$ | 1.75 | 1.735 | | 1.7796 | 1.78 | 1.7746 | 1.78 | 1.7746 | 1.77 | 1.765 |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.61 | 3.65 | 3.65 | 3.55 | 3.53 | 3.58 | 3.55 | 3.51 | 3.50 | 3.54 |
| | RI | 1.796 | 1.802 | 1.806 | 1.786 | 1.785 | 1.794 | 1.789 | 1.784 | 1.783 | 1.793 |

| | | \multicolumn{10}{c}{Exemplary Example Number} |
|---|---|---|---|---|---|---|---|---|---|---|---|
| | | 21 | 22 | 23 | 24 | 25 | 26 | 27 | 28 | 29 | 30 |
| Component (Mol. %) | $SiO_2$ | 49.9 | 49.93 | 49.89 | 49.89 | 49.92 | 49.88 | 49.87 | 49.87 | 49.86 | 49.9 |
| | $Nb_2O_5$ | 14.97 | 14.98 | 14.96 | 14.96 | 14.98 | 14.96 | 17.95 | 14.96 | 14.96 | 17.33 |
| | BaO | 4.99 | 4.99 | 4.99 | 4.99 | 7.98 | 12.15 | 12.15 | 12.15 | 12.15 | 8.47 |
| | $Na_2O$ | 7.34 | 11.45 | 8.9 | 10.66 | 8.34 | 8.33 | 8.33 | 8.33 | 8.31 | 16.91 |
| | $TiO_2$ | 2.99 | 3 | 2.99 | 2.99 | 2.99 | 2.99 | 2.99 | 5.98 | 3 | 4.55 |
| | $ZrO_2$ | 7.98 | 7.99 | 7.99 | 7.98 | 4.99 | 4.99 | 1.99 | 1.99 | 2 | 2.64 |
| | K2O | 5.36 | 4.45 | 3.27 | 0.4 | 6.44 | 6.43 | 6.44 | 6.44 | 6.43 | 0 |
| | CaO | 6.26 | 3.06 | 6.8 | 7.9 | 4.17 | 0 | 0 | 0 | 0 | 0 |
| | $La_2O_3$ | 0 | 0 | 0 | 0 | 0 | 0 | 0 | 0 | 2.99 | 0 |
| | $Y_2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.01 | 0.01 | 0.01 | 0.01 | 0.16 | 0.25 | 0.25 | 0.25 | 0.25 | 0.17 |
| | $Li_2O$ | 0 | 0 | 0 | 0 | 0 | 0 | 0 | 0 | 0 | 0 |
| | $Al_2O_3$ | 0.05 | 0.05 | 0.05 | 0.05 | 0.02 | 0.02 | 0.02 | 0.02 | 0.02 | 0.02 |
| | $WO_3$ | 0 | 0 | 0 | 0 | 0 | 0 | 0 | 0 | 0 | 0 |
| | MgO | 0.13 | 0.08 | 0.13 | 0.15 | 0 | 0 | 0 | 0 | 0 | 0 |

TABLE 5-continued

Exemplary Glass Compositions

|  |  |  |  |  |  |  |  |  |  |  |
|---|---|---|---|---|---|---|---|---|---|---|
|  | CeO$_2$ | 0 | 0 | 0 | 0 | 0 | 0 | 0 | 0 | 0.02 | 0 |
|  | Ta$_2$O$_5$ | 0 | 0 | 0 | 0 | 0 | 0 | 0.01 | 0 | 0.01 | 0 |
|  | Fe$_2$O$_3$ | 0.01 | 0.01 | 0.01 | 0.01 | 0 | 0 | 0 | 0 | 0 | 0 |
| Measured | n$_d$ |  | 1.775 | 1.7746 | 1.7896 | 1.783 | 1.7827 | 1.809 | 1.7898 | 1.787 |  |
|  | n$_C$ |  |  |  |  | 1.776 | 1.7752 | 1.801 | 1.7817 | 1.779 |  |
|  | n$_F$ |  |  |  |  | 1.802 | 1.8013 | 1.829 | 1.8098 | 1.805 |  |
|  | An. Pt, °C. |  |  |  |  | 632.6 | 644.3 | 631.5 | 624.3 | 632.8 |  |
|  | Strain P, °C. |  |  |  |  | 632.6 | 644.3 | 631.5 | 624.3 | 632.8 |  |
| Predicted | D, g/cm$^3$ | 3.57 | 3.54 | 3.58 | 3.61 | 3.58 | 3.70 | 3.73 | 3.65 | 3.85 | 3.64 |
|  | RI | 1.797 | 1.790 | 1.799 | 1.803 | 1.787 | 1.790 | 1.811 | 1.792 | 1.806 | 1.806 |

| | | Exemplary Example Number | | | | | | | | | |
|---|---|---|---|---|---|---|---|---|---|---|---|
| | | 31 | 32 | 33 | 34 | 35 | 36 | 37 | 38 | 39 | 40 |
| Component (Mol. %) | SiO$_2$ | 49.83 | 49.8 | 49.86 | 49.91 | 49.9 | 47.86 | 47.9 | 47.87 | 47.9 | 47.9 |
|  | Nb$_2$O$_5$ | 15.82 | 15.07 | 15.95 | 16.19 | 15.09 | 3.99 | 3.99 | 3.99 | 3.99 | 3.99 |
|  | BaO | 14.34 | 17.31 | 11.85 | 8.46 | 8.45 | 12.55 | 8.83 | 12.53 | 8.74 | 9.62 |
|  | Na$_2$O | 10.99 | 8.01 | 11.96 | 13.51 | 10.23 | 11.97 | 11.97 | 11.96 | 11.98 | 11.97 |
|  | TiO$_2$ | 4.57 | 4.57 | 6.1 | 7.97 | 11.26 | 7 | 9.53 | 13.23 | 14.53 | 11.57 |
|  | ZrO$_2$ | 4.11 | 4.85 | 4 | 3.77 | 4.87 | 0.99 | 1 | 1 | 1 | 1 |
|  | K2O | 0 | 0 | 0 | 0 | 0 | 0 | 0 | 0 | 0 | 0 |
|  | CaO | 0 | 0 | 0 | 0 | 0 | 0 | 0 | 0 | 0 | 0 |
|  | La$_2$O$_3$ | 0 | 0 | 0 | 0 | 0 | 0 | 0 | 0 | 0 | 0 |
|  | Y2O$_3$ | 0 | 0 | 0 | 0 | 0 | 0 | 0 | 0 | 0 | 0 |
|  | ZnO | 0 | 0 | 0 | 0 | 0 | 15.35 | 16.57 | 9.13 | 11.65 | 13.73 |
|  | SrO | 0.3 | 0.36 | 0.25 | 0.17 | 0.17 | 0.26 | 0.18 | 0.26 | 0.18 | 0.2 |
|  | Li$_2$O | 0 | 0 | 0 | 0 | 0 | 0 | 0 | 0 | 0 | 0 |
|  | Al$_2$O$_3$ | 0.03 | 0.03 | 0.02 | 0.02 | 0.02 | 0.03 | 0.02 | 0.03 | 0.02 | 0.02 |
|  | WO$_3$ | 0 | 0 | 0 | 0 | 0 | 0 | 0 | 0 | 0 | 0 |
|  | MgO | 0 | 0 | 0 | 0 | 0 | 0 | 0 | 0 | 0 | 0 |
|  | CeO$_2$ | 0 | 0 | 0 | 0 | 0 | 0 | 0 | 0 | 0 | 0 |
|  | Ta$_2$O$_5$ | 0 | 0.01 | 0 | 0 | 0 | 0 | 0 | 0 | 0 | 0 |
|  | Fe$_2$O$_3$ | 0 | 0 | 0 | 0 | 0 | 0 | 0 | 0 | 0 | 0 |
| Measured | D, g/cm$^3$ | 3.936 | 3.984 | 3.894 | 3798 | 3.746 | 3.717 | 3.705 | 3.650 | 3.615 | 3.621 |
|  | n$_d$ |  |  |  |  |  |  |  |  |  |  |
|  | n$_C$ |  |  |  |  |  |  |  |  |  |  |
|  | n$_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm$^3$ | 3.84 | 3.94 | 3.76 | 3.65 | 3.67 | 3.61 | 3.51 | 3.54 | 3.46 | 3.51 |
|  | RI | 1.814 | 1.818 | 1.816 | 1.817 | 1.828 | 1.701 | 1.706 | 1.721 | 1.722 | 1.713 |

| | | Exemplary Example Number | | | | | | | | | |
|---|---|---|---|---|---|---|---|---|---|---|---|
| | | 41 | 42 | 43 | 44 | 45 | 46 | 47 | 48 | 49 | 50 |
| Component (Mol. %) | SiO$_2$ | 44.84 | 44.82 | 44.82 | 44.83 | 44.86 | 49.92 | 49.87 | 49.87 | 49.9 | 49.93 |
|  | Nb$_2$O$_5$ | 8.15 | 5.98 | 7.4 | 8.49 | 11.18 | 14.98 | 17.95 | 14.96 | 14.97 | 14.98 |
|  | BaO | 14.94 | 14.93 | 14.94 | 14.94 | 14.94 | 7.98 | 12.15 | 12.15 | 7.98 | 7.98 |
|  | Na$_2$O | 11.96 | 11.95 | 11.95 | 11.95 | 11.95 | 8.34 | 8.33 | 8.33 | 5.98 | 9.9 |
|  | TiO$_2$ | 7.16 | 4.98 | 6.4 | 7.5 | 10.19 | 2.99 | 2.99 | 5.98 | 3 | 3 |
|  | ZrO$_2$ | 3.08 | 1.99 | 2.7 | 3.25 | 4.59 | 4.99 | 1.99 | 1.99 | 4.99 | 4.99 |
|  | K$_2$O | 0 | 0 | 0 | 0 | 0 | 6.44 | 6.44 | 6.44 | 6.37 | 5.67 |
|  | CaO | 0 | 0.02 | 0.02 | 0 | 0 | 4.17 | 0 | 0 | 6.6 | 3.36 |
|  | La$_2$O$_3$ | 1.98 | 10.07 | 11.37 | 3.99 | 0 | 0 | 0 | 0 | 0 | 0 |
|  | Y$_2$O$_3$ | 7.53 | 4.86 | 0 | 4.68 | 1.94 | 0 | 0 | 0 | 0 | 0 |
|  | ZnO | 0 | 0 | 0 | 0 | 0 | 0 | 0 | 0 | 0 | 0 |
|  | SrO | 0.31 | 0.31 | 0.31 | 0.31 | 0.31 | 0.16 | 0.25 | 0.25 | 0.16 | 0.16 |
|  | Li$_2$O | 0 | 0 | 0 | 0 | 0 | 0 | 0 | 0 | 0 | 0 |
|  | Al$_2$O$_3$ | 0.03 | 0.02 | 0.02 | 0.03 | 0.03 | 0.02 | 0.02 | 0.02 | 0.02 | 0.02 |
|  | WO$_3$ | 0 | 0 | 0 | 0 | 0 | 0 | 0 | 0 | 0 | 0 |
|  | MgO | 0 | 0 | 0 | 0 | 0 | 0 | 0 | 0 | 0.03 | 0 |
|  | CeO$_2$ | 0.01 | 0.06 | 0.06 | 0.03 | 0 | 0 | 0 | 0 | 0 | 0 |
|  | Ta$_2$O$_5$ | 0 | 0 | 0 | 0 | 0 | 0 | 0.01 | 0 | 0 | 0 |
|  | Fe$_2$O$_3$ | 0 | 0 | 0 | 0 | 0 | 0 | 0 | 0 | 0 | 0 |
| Measured | D, g/cm$^3$ | 4.064 | 4.192 | 4.216 | 4.097 | 3.991 | 3.576 | 3.693 | 3.642 | 3.600 | 3.567 |
|  | n$_d$ |  |  |  |  |  |  |  |  |  |  |
|  | n$_C$ |  |  |  |  |  |  |  |  |  |  |
|  | n$_F$ |  |  |  |  |  |  |  |  |  |  |
|  | An. Pt, °C. |  |  |  |  |  | 663.9 | 665.5 | 657.7 | 681.5 | 664.1 |
|  | Strain P, °C. |  |  |  |  |  | 629.6 |  | 622.9 | 646.2 | 628.8 |

TABLE 5-continued

| | | Exemplary Glass Compositions | | | | | | | | | |
|---|---|---|---|---|---|---|---|---|---|---|---|
| Predicted | D, g/cm³ | 4.15 | 4.49 | 4.42 | 4.17 | 3.89 | 3.58 | 3.73 | 3.65 | 3.60 | 3.58 |
| | RI | 1.824 | 1.841 | 1.842 | 1.827 | 1.817 | 1.787 | 1.811 | 1.792 | 1.792 | 1.785 |

| | | Exemplary Example Number | | | | | | | | | |
|---|---|---|---|---|---|---|---|---|---|---|---|
| | | 51 | 52 | 53 | 54 | 55 | 56 | 57 | 58 | 59 | 60 |
| Component (Mol. %) | $SiO_2$ | 44.97 | 44.99 | 45.01 | 50.02 | 49.99 | 50.01 | 49.99 | 49.99 | 50.01 | 49.88 |
| | $Nb_2O_5$ | 9.16 | 8.93 | 12 | 17.75 | 15.13 | 16.38 | 16.35 | 15.99 | 15.5 | 19.95 |
| | BaO | 10 | 10 | 10 | 5.49 | 10.96 | 9.42 | 5.96 | 7.88 | 9.87 | 7.98 |
| | $Na_2O$ | 5.97 | 5.99 | 5.97 | 6.1 | 3.62 | 4.77 | 5.78 | 3.98 | 3.54 | 16.96 |
| | $TiO_2$ | 8.17 | 7.93 | 11 | 3.39 | 3.4 | 3.79 | 7.24 | 6.12 | 4.58 | 4.98 |
| | $ZrO_2$ | 3.59 | 3.47 | 4.99 | 2.25 | 4.87 | 3.62 | 3.65 | 4.01 | 4.5 | 0 |
| | $K_2O$ | 3 | 3 | 3 | 6 | 2 | 4 | 4 | 3.99 | 3 | 0 |
| | CaO | 2.01 | 2 | 2 | 1.5 | 4 | 2 | 1.5 | 2.01 | 3 | 0 |
| | $La_2O_3$ | 7.07 | 0 | 0 | 0 | 0 | 0 | 0 | 0 | 0 | 0 |
| | $Y_2O_3$ | 0 | 7.67 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 3 | 3 | 3 | 1.5 | 3.99 | 2 | 1.5 | 2 | 3 | 0.17 |
| | $Li_2O$ | 3.01 | 3.01 | 3 | 6 | 2 | 4 | 4 | 4.01 | 2.99 | 0 |
| | $Al_2O_3$ | 0.02 | 0.02 | 0.02 | 0.01 | 0.02 | 0.02 | 0.01 | 0.02 | 0.02 | 0.04 |
| | $WO_3$ | 0 | 0 | 0 | 0 | 0 | 0 | 0 | 0 | 0 | 0 |
| | MgO | 0 | 0 | 0 | 0 | 0 | 0 | 0 | 0 | 0 | 0.03 |
| | $CeO_2$ | 0.04 | 0 | 0 | 0 | 0 | 0 | 0 | 0 | 0 | 0 |
| | $Ta_2O_5$ | 0 | 0 | 0 | 0 | 0 | 0 | 0 | 0 | 0 | 0 |
| | $Fe_2O_3$ | 0 | 0 | 0 | 0 | 0 | 0 | 0 | 0 | 0 | 0.01 |
| Measured | D, g/cm³ | | 4.062 | 3.711 | 3.547 | 3.779 | | | 3.665 | | 3.651 |
| | $n_d$ | | | | | | | | | | |
| | $n_C$ | | | | | | | | | | |
| | $n_F$ | | | | | | | | | | |
| | An. Pt, °C. | 654.9 | | 639 | 602.1 | 677.3 | 639.2 | | 630.7 | 656.8 | |
| | Strain P, °C. | 617.6 | | 603.5 | 567.3 | 640.6 | 603.6 | | 595.6 | 620.8 | |
| Predicted | D, g/cm³ | 4.09 | 3.95 | 3.73 | 3.53 | 3.83 | 3.70 | 3.58 | 3.66 | 3.76 | 3.65 |
| | RI | 1.834 | 1.821 | 1.818 | 1.804 | 1.817 | 1.811 | 1.817 | 1.817 | 1.817 | 1.825 |

| | | Exemplary Example Number | | | | | | | | | |
|---|---|---|---|---|---|---|---|---|---|---|---|
| | | 61 | 62 | 63 | 64 | 65 | 66 | 67 | 68 | 69 | 70 |
| Component (Mol. %) | $SiO_2$ | 49.88 | 49.89 | 49.91 | 49.93 | 49.91 | 49.97 | 49.98 | 49.95 | 49.96 | 49.92 |
| | $Nb_2O_5$ | 16.12 | 15.36 | 11.39 | 9.98 | 12.86 | 10 | 9.99 | 14.98 | 14.99 | 14.98 |
| | BaO | 6.83 | 6.6 | 5.41 | 4.99 | 5.85 | 9.99 | 9.99 | 7.99 | 8 | 7.99 |
| | $Na_2O$ | 16.2 | 16.05 | 15.25 | 14.97 | 15.55 | 0.01 | 14.94 | 17.28 | 14.82 | 12.32 |
| | $TiO_2$ | 7.75 | 11.89 | 15.1 | 19.96 | 12.11 | 10 | 9.99 | 3 | 2.99 | 3 |
| | $ZrO_2$ | 0 | 0 | 0 | 0 | 0 | 0 | 0 | 4.99 | 5 | 4.99 |
| | $K_2O$ | 0 | 0 | 0 | 0 | 0 | 0 | 0 | 0.83 | 3.31 | 3.27 |
| | CaO | 0 | 0 | 0 | 0 | 0 | 0 | 0.03 | 0.86 | 0.85 | 3.39 |
| | $La_2O_3$ | 0 | 0 | 0 | 0 | 0 | 0 | 0 | 0 | 0 | 0 |
| | $Y_2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.14 | 0.14 | 0.11 | 0.1 | 0.12 | 0.01 | 0.01 | 0.01 | 0.01 | 0.01 |
| | $Li_2O$ | 0 | 0 | 0 | 0 | 0 | 14.98 | 0 | 0 | 0 | 0 |
| | $Al_2O_3$ | 0.04 | 0.04 | 0.04 | 0.04 | 0.04 | 5 | 5 | 0.04 | 0.04 | 0.04 |
| | $WO_3$ | 3 | 0 | 2.75 | 0 | 3.53 | 0 | 0 | 0 | 0 | 0 |
| | MgO | 0.03 | 0.02 | 0.02 | 0.02 | 0.03 | 0 | 0.02 | 0.05 | 0.03 | 0.08 |
| | $CeO_2$ | 0 | 0 | 0 | 0 | 0 | 0 | 0 | 0 | 0 | 0 |
| | $Ta_2O_5$ | 0 | 0 | 0 | 0 | 0 | 0 | 0 | 0 | 0 | 0 |
| | $Fe_2O_3$ | 0.01 | 0.01 | 0.01 | 0.01 | 0.01 | 0.01 | 0.01 | 0.01 | 0.01 | 0.01 |
| Measured | D, g/cm³ | 3.651 | 3.533 | 3.528 | 3.375 | 3.584 | 3.399 | 3.378 | | | |
| | $n_d$ | | | | | | | | | | |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.67 | 3.50 | 3.50 | 3.32 | 3.58 | 3.34 | 3.38 | 3.58 | 3.57 | 3.59 |
| | RI | 1.806 | 1.803 | 1.784 | 1.778 | 1.790 | 1.740 | 1.728 | 1.780 | 1.780 | 1.785 |

| | | Exemplary Example Number | | | | | | | | | |
|---|---|---|---|---|---|---|---|---|---|---|---|
| | | 71 | 72 | 73 | 74 | 75 | 76 | 77 | 78 | 79 | 80 |
| Component (Mol. %) | $SiO_2$ | 49.91 | 49.91 | 49.88 | 49.91 | 49.95 | 49.93 | 49.92 | 49.93 | 49.92 | 49.89 |
| | $Nb_2O_5$ | 14.97 | 14.97 | 14.97 | 14.97 | 14.99 | 14.98 | 14.98 | 14.98 | 14.98 | 14.97 |
| | BaO | 7.99 | 7.99 | 7.99 | 7.99 | 8 | 7.99 | 7.99 | 7.99 | 7.98 | 7.98 |

TABLE 5-continued

Exemplary Glass Compositions

|  |  |  |  |  |  |  |  |  |  |  |
|---|---|---|---|---|---|---|---|---|---|---|
| Component (Mol. %) | Na$_2$O | 9.95 | 9.89 | 9.85 | 5.28 | 3.01 | 2.99 | 2.98 | 0.74 | 0.74 | 0.73 |
|  | TiO$_2$ | 3 | 3 | 2.99 | 3 | 3 | 3 | 3 | 2.99 | 2.99 | 2.99 |
|  | ZrO$_2$ | 4.99 | 4.99 | 4.99 | 4.99 | 4.99 | 4.99 | 4.99 | 4.99 | 4.99 | 4.99 |
|  | K$_2$O | 5.68 | 3.23 | 0.8 | 10.38 | 15.15 | 12.69 | 10.27 | 14.96 | 12.55 | 10.14 |
|  | CaO | 3.36 | 5.85 | 8.31 | 3.32 | 0.82 | 3.28 | 5.72 | 3.27 | 5.68 | 8.09 |
|  | La$_2$O$_3$ | 0 | 0 | 0 | 0 | 0 | 0 | 0 | 0 | 0 | 0 |
|  | Y$_2$O$_3$ | 0 | 0 | 0 | 0 | 0 | 0 | 0 | 0 | 0 | 0 |
|  | ZnO | 0 | 0 | 0 | 0 | 0 | 0 | 0 | 0 | 0 | 0 |
|  | SrO | 0.01 | 0.01 | 0.01 | 0.01 | 0.01 | 0.01 | 0.01 | 0.01 | 0.01 | 0.01 |
|  | Li$_2$O | 0 | 0 | 0 | 0 | 0 | 0 | 0 | 0 | 0 | 0 |
|  | Al$_2$O$_3$ | 0.04 | 0.04 | 0.04 | 0.04 | 0.04 | 0.04 | 0.04 | 0.04 | 0.04 | 0.04 |
|  | WO$_3$ | 0 | 0 | 0 | 0 | 0 | 0 | 0 | 0 | 0 | 0 |
|  | MgO | 0.08 | 0.1 | 0.15 | 0.08 | 0.03 | 0.08 | 0.1 | 0.08 | 0.11 | 0.16 |
|  | CeO$_2$ | 0 | 0 | 0 | 0 | 0 | 0 | 0 | 0 | 0 | 0 |
|  | Ta$_2$O$_5$ | 0 | 0 | 0 | 0 | 0 | 0 | 0 | 0 | 0 | 0 |
|  | Fe$_2$O$_3$ | 0.01 | 0.01 | 0.01 | 0.01 | 0.01 | 0.01 | 0.01 | 0.01 | 0.01 | 0.01 |
| Measured | D, g/cm$^3$ |  |  |  |  |  |  |  |  |  |  |
|  | n$_d$ |  |  |  |  |  |  |  |  |  |  |
|  | n$_C$ |  |  |  |  |  |  |  |  |  |  |
|  | n$_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm$^3$ | 3.58 | 3.61 | 3.64 | 3.55 | 3.50 | 3.54 | 3.57 | 3.53 | 3.56 | 3.59 |
|  | RI | 1.785 | 1.791 | 1.797 | 1.783 | 1.776 | 1.782 | 1.789 | 1.782 | 1.788 | 1.794 |

| | | Exemplary Example Number | | | | | | | | | |
|---|---|---|---|---|---|---|---|---|---|---|---|
| | | 81 | 82 | 83 | 84 | 85 | 86 | 87 | 88 | 89 | 90 |
| Component (Mol. %) | SiO$_2$ | 49.95 | 49.89 | 49.91 | 49.89 | 49.9 | 49.89 | 49.89 | 49.88 | 49.85 | 49.84 |
|  | Nb$_2$O$_5$ | 14.98 | 14.96 | 14.97 | 14.97 | 14.97 | 14.97 | 14.96 | 14.96 | 14.96 | 14.95 |
|  | BaO | 7.99 | 7.98 | 7.99 | 7.98 | 7.98 | 7.99 | 7.98 | 7.98 | 7.98 | 7.97 |
|  | Na$_2$O | 8.39 | 8.28 | 6.04 | 5.98 | 3.72 | 3.71 | 7.48 | 2.96 | 2.93 | 2.92 |
|  | TiO$_2$ | 2.99 | 2.99 | 3 | 3 | 2.99 | 2.99 | 2.99 | 2.99 | 2.99 | 2.99 |
|  | ZrO$_2$ | 5 | 4.99 | 5 | 4.99 | 4.99 | 4.99 | 4.99 | 4.98 | 4.99 | 4.99 |
|  | K$_2$O | 8.91 | 1.6 | 8.8 | 3.97 | 8.7 | 6.29 | 0.79 | 5.47 | 3.12 | 0.78 |
|  | CaO | 1.67 | 9.09 | 4.14 | 9.02 | 6.55 | 8.95 | 10.68 | 10.53 | 12.91 | 15.24 |
|  | La$_2$O$_3$ | 0 | 0 | 0 | 0 | 0 | 0 | 0 | 0 | 0 | 0 |
|  | Y$_2$O$_3$ | 0 | 0 | 0 | 0 | 0 | 0 | 0 | 0 | 0 | 0 |
|  | ZnO | 0 | 0 | 0 | 0 | 0 | 0 | 0 | 0 | 0 | 0 |
|  | SrO | 0.01 | 0.01 | 0.01 | 0.01 | 0.01 | 0.01 | 0.01 | 0.01 | 0.01 | 0.01 |
|  | Li$_2$O | 0 | 0 | 0 | 0 | 0 | 0 | 0 | 0 | 0 | 0 |
|  | Al$_2$O$_3$ | 0.04 | 0.04 | 0.04 | 0.04 | 0.04 | 0.04 | 0.04 | 0.04 | 0.04 | 0.04 |
|  | WO$_3$ | 0 | 0 | 0 | 0 | 0 | 0 | 0 | 0 | 0 | 0 |
|  | MgO | 0.05 | 0.15 | 0.08 | 0.15 | 0.13 | 0.15 | 0.18 | 0.18 | 0.2 | 0.25 |
|  | CeO$_2$ | 0 | 0 | 0 | 0 | 0 | 0 | 0 | 0 | 0 | 0 |
|  | Ta$_2$O$_5$ | 0 | 0 | 0 | 0 | 0 | 0 | 0 | 0 | 0 | 0 |
|  | Fe$_2$O$_3$ | 0.01 | 0.01 | 0.01 | 0.01 | 0.01 | 0.01 | 0.01 | 0.01 | 0.01 | 0.01 |
| Measured | D, g/cm$^3$ |  |  |  |  |  |  |  |  |  |  |
|  | n$_d$ |  |  |  |  |  |  |  |  |  |  |
|  | n$_C$ |  |  |  |  |  |  |  |  |  |  |
|  | n$_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm$^3$ | 3.55 | 3.64 | 3.57 | 3.63 | 3.59 | 3.62 | 3.66 | 3.64 | 3.67 | 3.70 |
|  | RI | 1.780 | 1.799 | 1.786 | 1.798 | 1.791 | 1.797 | 1.803 | 1.801 | 1.807 | 1.813 |

| | | Exemplary Example Number | | | | | | | | | |
|---|---|---|---|---|---|---|---|---|---|---|---|
| | | 91 | 92 | 93 | 94 | 95 | 96 | 97 | 98 | 99 | 100 |
| Component (Mol. %) | SiO$_2$ | 49.88 | 49.84 | 49.84 | 49.93 | 49.93 | 49.93 | 49.94 | 49.91 | 49.89 | 49.92 |
|  | Nb$_2$O$_5$ | 14.96 | 14.95 | 14.95 | 14.98 | 14.98 | 14.98 | 14.98 | 14.97 | 14.97 | 14.98 |
|  | BaO | 7.98 | 7.97 | 7.97 | 4.99 | 4.99 | 4.99 | 5 | 4.99 | 4.99 | 5 |
|  | Na$_2$O | 0.74 | 0.73 | 0.72 | 16.81 | 16.21 | 14.98 | 14.37 | 13.14 | 12.54 | 13.13 |
|  | TiO$_2$ | 2.99 | 2.99 | 2.99 | 3 | 3 | 3 | 3 | 3 | 2.99 | 3 |
|  | ZrO$_2$ | 4.99 | 4.98 | 4.98 | 7.99 | 7.99 | 7.99 | 7.99 | 7.98 | 7.98 | 7.99 |
|  | K$_2$O | 7.76 | 3.08 | 0.77 | 1.57 | 0.39 | 1.58 | 4 | 1.6 | 0.4 | 5.25 |
|  | CaO | 10.45 | 15.13 | 17.44 | 0.6 | 2.37 | 2.4 | 0.61 | 4.23 | 6.03 | 0.61 |
|  | La$_2$O$_3$ | 0 | 0 | 0 | 0 | 0 | 0 | 0 | 0 | 0 | 0 |
|  | Y$_2$O$_3$ | 0 | 0 | 0 | 0 | 0 | 0 | 0 | 0 | 0 | 0 |
|  | ZnO | 0 | 0 | 0 | 0 | 0 | 0 | 0 | 0 | 0 | 0 |
|  | SrO | 0.01 | 0.01 | 0.01 | 0.01 | 0.01 | 0.01 | 0.01 | 0.01 | 0.01 | 0.01 |
|  | Li$_2$O | 0 | 0 | 0 | 0 | 0 | 0 | 0 | 0 | 0 | 0 |

TABLE 5-continued

| | | \multicolumn{10}{c}{Exemplary Glass Compositions} | | | | | | | | | |
|---|---|---|---|---|---|---|---|---|---|---|---|
| | Al₂O₃ | 0.04 | 0.04 | 0.04 | 0.05 | 0.05 | 0.05 | 0.05 | 0.05 | 0.05 | 0.05 |
| | WO₃ | 0 | 0 | 0 | 0 | 0 | 0 | 0 | 0 | 0 | 0 |
| | MgO | 0.18 | 0.25 | 0.28 | 0.05 | 0.08 | 0.08 | 0.05 | 0.1 | 0.13 | 0.05 |
| | CeO₂ | 0 | 0 | 0 | 0 | 0 | 0 | 0 | 0 | 0 | 0 |
| | Ta₂O₅ | 0 | 0 | 0 | 0 | 0 | 0 | 0 | 0 | 0 | 0 |
| | Fe₂O₃ | 0.01 | 0.01 | 0.01 | 0.01 | 0.01 | 0.01 | 0.01 | 0.01 | 0.01 | 0.01 |
| Measured | D, g/cm³ | | | | | | | | | | |
| | $n_d$ | | | | | | | | | | |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.62 | 3.69 | 3.72 | 3.54 | 3.56 | 3.55 | 3.53 | 3.57 | 3.59 | 3.52 |
| | RI | 1.800 | 1.813 | 1.818 | 1.786 | 1.790 | 1.790 | 1.785 | 1.794 | 1.798 | 1.784 |

| | | \multicolumn{10}{c}{Exemplary Example Number} | | | | | | | | | |
|---|---|---|---|---|---|---|---|---|---|---|---|
| | | 101 | 102 | 103 | 104 | 105 | 106 | 107 | 108 | 109 | 110 |
| Component (Mol. %) | SiO₂ | 49.93 | 49.93 | 49.92 | 49.92 | 49.93 | 49.9 | 49.88 | 49.87 | 49.88 | 49.9 |
| | Nb₂O₅ | 14.98 | 14.98 | 14.98 | 14.97 | 14.98 | 17.71 | 17.34 | 16.96 | 16.95 | 16.94 |
| | BaO | 4.99 | 5 | 4.99 | 4.99 | 4.99 | 8.47 | 9.94 | 11.41 | 9.93 | 8.46 |
| | Na₂O | 11.22 | 10.54 | 9.92 | 9.29 | 8.59 | 18.09 | 16.61 | 15.12 | 15.44 | 15.77 |
| | TiO₂ | 3 | 3 | 2.99 | 2.99 | 2.99 | 3.39 | 3.39 | 3.39 | 4.56 | 5.71 |
| | ZrO₂ | 7.98 | 7.99 | 7.99 | 7.99 | 7.99 | 2.25 | 2.62 | 2.99 | 3.01 | 3.02 |
| | K₂O | 5.29 | 7.81 | 6.56 | 5.33 | 7.87 | 0 | 0 | 0 | 0 | 0 |
| | CaO | 2.46 | 0.63 | 2.49 | 4.34 | 2.5 | 0 | 0 | 0 | 0 | 0 |
| | La₂O₃ | 0 | 0 | 0 | 0 | 0 | 0 | 0 | 0 | 0 | 0 |
| | Y₂O₃ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.01 | 0.01 | 0.01 | 0.01 | 0.01 | 0.18 | 0.21 | 0.24 | 0.21 | 0.17 |
| | Li₂O | 0 | 0 | 0 | 0 | 0 | 0 | 0 | 0 | 0 | 0 |
| | Al₂O₃ | 0.05 | 0.04 | 0.05 | 0.05 | 0.04 | 0.02 | 0.02 | 0.02 | 0.02 | 0.02 |
| | WO₃ | 0 | 0 | 0 | 0 | 0 | 0 | 0 | 0 | 0 | 0 |
| | MgO | 0.08 | 0.05 | 0.08 | 0.1 | 0.08 | 0 | 0 | 0 | 0 | 0 |
| | CeO₂ | 0 | 0 | 0 | 0 | 0 | 0 | 0 | 0 | 0 | 0 |
| | Ta₂O₅ | 0 | 0 | 0 | 0 | 0 | 0 | 0 | 0 | 0 | 0 |
| | Fe₂O₃ | 0.01 | 0.01 | 0.01 | 0.01 | 0.01 | 0 | 0 | 0 | 0 | 0 |
| Measured | D, g/cm³ | | | | | | | | | | |
| | $n_d$ | | | | | | | | | | |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.54 | 3.51 | 3.53 | 3.55 | 3.52 | 3.63 | 3.68 | 3.73 | 3.69 | 3.64 |
| | RI | 1.789 | 1.784 | 1.788 | 1.793 | 1.788 | 1.802 | 1.804 | 1.806 | 1.808 | 1.809 |

| | | \multicolumn{10}{c}{Exemplary Example Number} | | | | | | | | | |
|---|---|---|---|---|---|---|---|---|---|---|---|
| | | 111 | 112 | 113 | 114 | 115 | 116 | 117 | 118 | 119 | 120 |
| Component (Mol. %) | SiO₂ | 49.85 | 49.86 | 49.88 | 49.9 | 49.84 | 49.82 | 49.81 | 49.82 | 49.83 | 49.79 |
| | Nb₂O₅ | 16.59 | 16.58 | 16.57 | 16.56 | 16.2 | 15.83 | 15.44 | 15.45 | 15.44 | 15.06 |
| | BaO | 12.9 | 11.39 | 9.92 | 8.46 | 14.38 | 15.87 | 17.37 | 15.82 | 14.3 | 18.87 |
| | Na₂O | 13.63 | 13.97 | 14.3 | 14.63 | 12.13 | 10.63 | 9.12 | 9.5 | 9.88 | 7.61 |
| | TiO₂ | 3.38 | 4.55 | 5.71 | 6.84 | 3.38 | 3.38 | 3.39 | 4.56 | 5.73 | 3.39 |
| | ZrO₂ | 3.36 | 3.37 | 3.39 | 3.4 | 3.73 | 4.1 | 4.48 | 4.48 | 4.49 | 4.85 |
| | K2O | 0 | 0 | 0 | 0 | 0 | 0 | 0 | 0 | 0 | 0 |
| | CaO | 0 | 0 | 0 | 0 | 0 | 0 | 0 | 0 | 0 | 0 |
| | La₂O₃ | 0 | 0 | 0 | 0 | 0 | 0 | 0 | 0 | 0 | 0 |
| | Y₂O₃ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.26 | 0.24 | 0.21 | 0.17 | 0.3 | 0.33 | 0.36 | 0.33 | 0.3 | 0.39 |
| | Li₂O | 0 | 0 | 0 | 0 | 0 | 0 | 0 | 0 | 0 | 0 |
| | Al₂O₃ | 0.02 | 0.02 | 0.02 | 0.02 | 0.03 | 0.03 | 0.03 | 0.03 | 0.03 | 0.03 |
| | WO₃ | 0 | 0 | 0 | 0 | 0 | 0 | 0 | 0 | 0 | 0 |

TABLE 5-continued

| | | Exemplary Glass Compositions | | | | | | | | | |
|---|---|---|---|---|---|---|---|---|---|---|---|
| | MgO | 0 | 0 | 0 | 0 | 0 | 0 | 0 | 0 | 0 | 0 |
| | $CeO_2$ | 0 | 0 | 0 | 0 | 0 | 0 | 0 | 0 | 0 | 0 |
| | $Ta_2O_5$ | 0 | 0 | 0 | 0 | 0 | 0.01 | 0.01 | 0.01 | 0 | 0.01 |
| | $Fe_2O_3$ | 0 | 0 | 0 | 0 | 0 | 0 | 0 | 0 | 0 | 0 |
| Measured | D, g/cm³ | | | | | | | | | | |
| | $n_d$ | | | | | | | | | | |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.78 | 3.74 | 3.69 | 3.65 | 3.84 | 3.89 | 3.94 | 3.89 | 3.84 | 3.99 |
| | RI | 1.808 | 1.810 | 1.812 | 1.813 | 1.810 | 1.812 | 1.815 | 1.816 | 1.818 | 1.817 |

| | | Exemplary Example Number | | | | | | | | | |
|---|---|---|---|---|---|---|---|---|---|---|---|
| | | 121 | 122 | 123 | 124 | 125 | 126 | 127 | 128 | 129 | 130 |
| Component (Mol. %) | $SiO_2$ | 49.81 | 49.83 | 49.85 | 49.86 | 49.88 | 49.9 | 49.86 | 49.88 | 49.86 | 49.87 |
| | $Nb_2O_5$ | 15.07 | 15.07 | 16.34 | 16.32 | 16.32 | 16.31 | 15.95 | 15.94 | 15.57 | 15.58 |
| | BaO | 15.77 | 14.26 | 13.38 | 11.87 | 10.39 | 8.94 | 13.34 | 10.38 | 13.31 | 11.83 |
| | $Na_2O$ | 8.38 | 8.77 | 12.75 | 13.1 | 13.44 | 13.76 | 11.61 | 12.31 | 10.49 | 10.84 |
| | $TiO_2$ | 5.73 | 6.87 | 3.77 | 4.95 | 6.09 | 7.23 | 4.95 | 7.24 | 6.11 | 7.24 |
| | $ZrO_2$ | 4.86 | 4.86 | 3.61 | 3.62 | 3.64 | 3.65 | 3.99 | 4.01 | 4.36 | 4.37 |
| | $K_2O$ | 0 | 0 | 0 | 0 | 0 | 0 | 0 | 0 | 0 | 0 |
| | CaO | 0 | 0 | 0 | 0 | 0 | 0 | 0 | 0 | 0 | 0 |
| | $La_2O_3$ | 0 | 0 | 0 | 0 | 0 | 0 | 0 | 0 | 0 | 0 |
| | $Y_2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.33 | 0.29 | 0.27 | 0.25 | 0.22 | 0.18 | 0.27 | 0.22 | 0.27 | 0.25 |
| | $Li_2O$ | 0 | 0 | 0 | 0 | 0 | 0 | 0 | 0 | 0 | 0 |
| | $Al_2O_3$ | 0.03 | 0.03 | 0.02 | 0.02 | 0.02 | 0.02 | 0.02 | 0.02 | 0.02 | 0.02 |
| | $WO_3$ | 0 | 0 | 0 | 0 | 0 | 0 | 0 | 0 | 0 | 0 |
| | MgO | 0 | 0 | 0 | 0 | 0 | 0 | 0 | 0 | 0 | 0 |
| | $CeO_2$ | 0 | 0 | 0 | 0 | 0 | 0 | 0 | 0 | 0 | 0 |
| | $Ta_2O_5$ | 0 | 0 | 0 | 0 | 0 | 0 | 0 | 0 | 0 | 0 |
| | $Fe_2O_3$ | 0 | 0 | 0 | 0 | 0 | 0 | 0 | 0 | 0 | 0 |
| Measured | D, g/cm³ | | | | | | | | | | |
| | $n_d$ | | | | | | | | | | |
| | $n_C$ | | | | | | | | | | |
| | $n_F$ | | | | | | | | | | |
| | An. Pt, °C. | | | | | | | | | | |
| | Strain P, °C. | | | | | | | | | | |
| Predicted | D, g/cm³ | 3.90 | 3.85 | 3.80 | 3.76 | 3.71 | 3.67 | 3.81 | 3.72 | 3.81 | 3.77 |
| | RI | 1.820 | 1.822 | 1.810 | 1.812 | 1.813 | 1.815 | 1.814 | 1.817 | 1.818 | 1.819 |

| | | Exemplary Example Number | | | | | | | | | |
|---|---|---|---|---|---|---|---|---|---|---|---|
| | | 131 | 132 | 133 | 134 | 135 | 136 | 137 | 138 | 139 | 140 |
| Component (Mol. %) | $SiO_2$ | 49.85 | 49.89 | 49.9 | 49.87 | 49.9 | 49.9 | 49.87 | 49.87 | 49.9 | 50.12 |
| | $Nb_2O_5$ | 15.2 | 15.82 | 15.82 | 15.45 | 15.45 | 15.45 | 15.08 | 15.08 | 15.09 | 18.04 |
| | BaO | 13.27 | 9.9 | 8.46 | 11.33 | 9.88 | 8.45 | 12.77 | 11.31 | 9.87 | 13.03 |
| | $Na_2O$ | 9.38 | 12.05 | 12.4 | 10.6 | 10.95 | 11.31 | 9.13 | 9.5 | 9.86 | 7.47 |
| | $TiO_2$ | 7.25 | 7.98 | 9.08 | 7.99 | 9.09 | 10.18 | 8 | 9.11 | 10.19 | 3.01 |
| | $ZrO_2$ | 4.74 | 4.14 | 4.14 | 4.5 | 4.5 | 4.51 | 4.86 | 4.86 | 4.86 | 2.01 |
| | $K_2O$ | 0 | 0 | 0 | 0 | 0 | 0 | 0 | 0 | 0 | 6.02 |
| | CaO | 0 | 0 | 0 | 0 | 0 | 0 | 0 | 0 | 0 | 0 |
| | $La_2O_3$ | 0 | 0 | 0 | 0 | 0 | 0 | 0 | 0 | 0 | 0 |
| | $Y_2O_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.27 | 0.21 | 0.17 | 0.24 | 0.2 | 0.17 | 0.26 | 0.24 | 0.2 | 0.27 |
| | $Li_2O$ | 0 | 0 | 0 | 0 | 0 | 0 | 0 | 0 | 0 | 0 |
| | $Al_2O_3$ | 0.02 | 0.02 | 0.02 | 0.02 | 0.02 | 0.02 | 0.02 | 0.02 | 0.02 | 0.02 |
| | $WO_3$ | 0 | 0 | 0 | 0 | 0 | 0 | 0 | 0 | 0 | 0 |
| | MgO | 0 | 0 | 0 | 0 | 0 | 0 | 0 | 0 | 0 | 0 |

TABLE 5-continued

| | | Exemplary Glass Compositions | | | | | | | | | |
|---|---|---|---|---|---|---|---|---|---|---|---|
| | CeO$_2$ | 0 | 0 | 0 | 0 | 0 | 0 | 0 | 0 | 0 | 0 |
| | Ta$_2$O$_5$ | 0 | 0 | 0 | 0 | 0 | 0 | 0 | 0 | 0 | 0.01 |
| | Fe$_2$O$_3$ | 0 | 0 | 0 | 0 | 0 | 0 | 0 | 0 | 0 | 0 |
| Measured | D, g/cm$^3$ | | | | | | | | | | |
| | n$_d$ | | | | | | | | | | |
| | n$_C$ | | | | | | | | | | |
| | n$_F$ | | | | | | | | | | |
| | An. Pt, ° C. | | | | | | | | | | |
| | Strain P, ° C. | | | | | | | | | | |
| Predicted | D, g/cm$^3$ | 3.82 | 3.70 | 3.66 | 3.75 | 3.71 | 3.67 | 3.80 | 3.76 | 3.71 | 3.77 |
| | RI | 1.821 | 1.819 | 1.821 | 1.821 | 1.823 | 1.824 | 1.823 | 1.825 | 1.826 | 1.815 |

| | | Exemplary Example Number | | | | | | | | | |
|---|---|---|---|---|---|---|---|---|---|---|---|
| | | 141 | 142 | 143 | 144 | 145 | 146 | 147 | 148 | 149 | 150 |
| Component (Mol. %) | SiO$_2$ | 49.05 | 50.82 | 48.42 | 50.06 | 51.52 | 47.8 | 49.47 | 50.76 | 52.18 | 46.97 |
| | Nb$_2$O$_5$ | 17.95 | 16.4 | 17.94 | 16.38 | 15.31 | 17.93 | 16.37 | 15.28 | 14.26 | 17.94 |
| | BaO | 14.07 | 12.38 | 14.91 | 13.45 | 11.97 | 15.77 | 14.26 | 13.01 | 11.58 | 16.93 |
| | Na$_2$O | 7.65 | 7.6 | 7.4 | 7.27 | 7.32 | 7.17 | 7.05 | 7.02 | 7.06 | 6.82 |
| | TiO$_2$ | 3.3 | 5.13 | 3.56 | 5.45 | 6.62 | 3.8 | 5.69 | 6.96 | 8.06 | 4.12 |
| | ZrO$_2$ | 1.99 | 2 | 2 | 1.99 | 1.99 | 1.99 | 1.99 | 1.99 | 1.99 | 1.99 |
| | K$_2$O | 5.67 | 5.41 | 5.42 | 5.09 | 4.99 | 5.17 | 4.85 | 4.68 | 4.6 | 4.84 |
| | CaO | 0 | 0 | 0 | 0 | 0 | 0 | 0 | 0 | 0 | 0 |
| | La$_2$O$_3$ | 0 | 0 | 0 | 0 | 0 | 0 | 0 | 0 | 0 | 0 |
| | Y$_2$O$_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.29 | 0.25 | 0.31 | 0.28 | 0.25 | 0.32 | 0.29 | 0.27 | 0.24 | 0.35 |
| | Li$_2$O | 0 | 0 | 0 | 0 | 0 | 0 | 0 | 0 | 0 | 0 |
| | Al$_2$O$_3$ | 0.02 | 0.02 | 0.03 | 0.02 | 0.02 | 0.03 | 0.03 | 0.02 | 0.02 | 0.03 |
| | WO$_3$ | 0 | 0 | 0 | 0 | 0 | 0 | 0 | 0 | 0 | 0 |
| | MgO | 0 | 0 | 0 | 0 | 0 | 0 | 0 | 0 | 0 | 0 |
| | CeO$_2$ | 0 | 0 | 0 | 0 | 0 | 0 | 0 | 0 | 0 | 0 |
| | Ta$_2$O$_5$ | 0.01 | 0 | 0.01 | 0.01 | 0 | 0.01 | 0.01 | 0 | 0 | 0.01 |
| | Fe$_2$O$_3$ | 0 | 0 | 0 | 0 | 0 | 0 | 0 | 0 | 0 | 0 |
| Measured | D, g/cm$^3$ | | | | | | | | | | |
| | n$_d$ | | | | | | | | | | |
| | n$_C$ | | | | | | | | | | |
| | n$_F$ | | | | | | | | | | |
| | An. Pt, ° C. | | | | | | | | | | |
| | Strain P, ° C. | | | | | | | | | | |
| Predicted | D, g/cm$^3$ | 3.82 | 3.70 | 3.85 | 3.75 | 3.66 | 3.89 | 3.79 | 3.71 | 3.62 | 3.95 |
| | RI | 1.820 | 1.804 | 1.825 | 1.810 | 1.797 | 1.830 | 1.815 | 1.803 | 1.791 | 1.837 |

| | | Exemplary Example Number | | | | | | | | | |
|---|---|---|---|---|---|---|---|---|---|---|---|
| | | 151 | 152 | 153 | 154 | 155 | 156 | 157 | 158 | 159 | 160 |
| Component (Mol. %) | SiO$_2$ | 46.32 | 48.27 | 45.67 | 47.67 | 49.03 | 46.83 | 48.24 | 49.58 | 48.16 | 49.52 |
| | Nb$_2$O$_5$ | 17.92 | 16.35 | 17.93 | 16.34 | 15.23 | 16.32 | 15.2 | 14.15 | 17.14 | 15.99 |
| | BaO | 17.81 | 15.92 | 18.7 | 16.76 | 15.41 | 17.9 | 16.51 | 15.19 | 15.71 | 14.38 |
| | Na$_2$O | 6.58 | 6.55 | 6.32 | 6.3 | 6.3 | 5.97 | 5.97 | 5.97 | 6.89 | 6.86 |
| | TiO$_2$ | 4.37 | 6.19 | 4.64 | 6.44 | 7.71 | 6.78 | 8.06 | 9.24 | 4.97 | 6.28 |
| | ZrO$_2$ | 1.99 | 2 | 1.99 | 1.99 | 1.99 | 1.99 | 1.99 | 2 | 1.99 | 2 |
| | K2O | 4.58 | 4.36 | 4.32 | 4.11 | 3.97 | 3.78 | 3.65 | 3.52 | 4.8 | 4.63 |
| | CaO | 0 | 0 | 0 | 0 | 0 | 0 | 0 | 0 | 0 | 0 |
| | La$_2$O$_3$ | 0 | 0 | 0 | 0 | 0 | 0 | 0 | 0 | 0 | 0 |
| | Y$_2$O$_3$ | 0 | 0 | 0 | 0 | 0 | 0 | 0 | 0 | 0 | 0 |
| | ZnO | 0 | 0 | 0 | 0 | 0 | 0 | 0 | 0 | 0 | 0 |
| | SrO | 0.37 | 0.33 | 0.39 | 0.35 | 0.32 | 0.38 | 0.34 | 0.31 | 0.3 | 0.3 |
| | Li$_2$O | 0 | 0 | 0 | 0 | 0 | 0 | 0 | 0 | 0 | 0 |
| | Al$_2$O$_3$ | 0.03 | 0.03 | 0.03 | 0.03 | 0.03 | 0.03 | 0.03 | 0.03 | 0.03 | 0.03 |
| | WO$_3$ | 0 | 0 | 0 | 0 | 0 | 0 | 0 | 0 | 0 | 0 |

TABLE 5-continued

|  |  | Exemplary Glass Compositions | | | | | | | | | |
|---|---|---|---|---|---|---|---|---|---|---|---|
|  | MgO | 0 | 0 | 0 | 0 | 0 | 0 | 0 | 0 | 0 | 0 |
|  | $CeO_2$ | 0 | 0 | 0 | 0 | 0 | 0 | 0 | 0 | 0 | 0 |
|  | $Ta_2O_5$ | 0.01 | 0.01 | 0.01 | 0.01 | 0 | 0.01 | 0.01 | 0 | 0.01 | 0.01 |
|  | $Fe_2O_3$ | 0 | 0 | 0 | 0 | 0 | 0 | 0 | 0 | 0 | 0 |
| Measured | D, g/cm³ | | | | | | | | | | |
|  | $n_d$ | | | | | | | | | | |
|  | $n_C$ | | | | | | | | | | |
|  | $n_F$ | | | | | | | | | | |
|  | An. Pt, °C. | | | | | | | | | | |
|  | Strain P, °C. | | | | | | | | | | |
| Predicted | D, g/cm³ | 3.99 | 3.87 | 4.03 | 3.90 | 3.82 | 3.96 | 3.87 | 3.78 | 3.87 | 3.79 |
|  | RI | 1.842 | 1.824 | 1.847 | 1.829 | 1.817 | 1.836 | 1.823 | 1.811 | 1.826 | 1.814 |

|  |  | Exemplary Example Number | | | | | | | | | |
|---|---|---|---|---|---|---|---|---|---|---|---|
|  |  | 161 | 162 | 163 | 164 | 165 | 166 | 167 | 168 | 169 | 170 |
| Component (Mol. %) | $SiO_2$ | 50.83 | 52.04 | 48.93 | 50.23 | 51.48 | 49.66 | 50.93 | 50.38 | 53.02 | 52.1 |
|  | $Nb_2O_5$ | 14.92 | 13.91 | 15.98 | 14.9 | 13.88 | 14.88 | 13.86 | 13.83 | 12.95 | 13.23 |
|  | BaO | 13.13 | 11.96 | 15.2 | 13.91 | 12.71 | 14.71 | 13.48 | 14.25 | 11.09 | 12.2 |
|  | $Na_2O$ | 6.84 | 6.82 | 6.64 | 6.62 | 6.6 | 6.38 | 6.37 | 6.13 | 6.73 | 6.51 |
|  | $TiO_2$ | 7.53 | 8.69 | 6.53 | 7.78 | 8.94 | 8.03 | 9.19 | 9.45 | 9.88 | 9.77 |
|  | $ZrO_2$ | 1.99 | 1.99 | 1.99 | 1.99 | 2 | 2 | 1.99 | 2 | 1.99 | 2 |
|  | $K_2O$ | 4.48 | 4.32 | 4.39 | 4.24 | 4.1 | 4 | 3.86 | 3.63 | 4.1 | 3.92 |
|  | CaO | 0 | 0 | 0 | 0 | 0 | 0 | 0 | 0 | 0 | 0 |
|  | $La_2O_3$ | 0 | 0 | 0 | 0 | 0 | 0 | 0 | 0 | 0 | 0 |
|  | $Y_2O_3$ | 0 | 0 | 0 | 0 | 0 | 0 | 0 | 0 | 0 | 0 |
|  | ZnO | 0 | 0 | 0 | 0 | 0 | 0 | 0 | 0 | 0 | 0 |
|  | SrO | 0.27 | 0.25 | 0.31 | 0.29 | 0.26 | 0.3 | 0.28 | 0.3 | 0.23 | 0.25 |
|  | $Li_2O$ | 0 | 0 | 0 | 0 | 0 | 0 | 0 | 0 | 0 | 0 |
|  | $Al_2O_3$ | 0.02 | 0.02 | 0.03 | 0.03 | 0.02 | 0.03 | 0.03 | 0.03 | 0.02 | 0.02 |
|  | $WO_3$ | 0 | 0 | 0 | 0 | 0 | 0 | 0 | 0 | 0 | 0 |
|  | MgO | 0 | 0 | 0 | 0 | 0 | 0 | 0 | 0 | 0 | 0 |
|  | $CeO_2$ | 0 | 0 | 0 | 0 | 0 | 0 | 0 | 0 | 0 | 0 |
|  | $Ta_2O_5$ | 0 | 0 | 0.01 | 0 | 0 | 0 | 0 | 0 | 0 | 0 |
|  | $Fe_2O_3$ | 0 | 0 | 0 | 0 | 0 | 0 | 0 | 0 | 0 | 0 |
| Measured | D, g/cm³ | | | | | | | | | | |
|  | $n_d$ | | | | | | | | | | |
|  | $n_C$ | | | | | | | | | | |
|  | $n_F$ | | | | | | | | | | |
|  | An. Pt, °C. | | | | | | | | | | |
|  | Strain P, °C. | | | | | | | | | | |
| Predicted | D, g/cm³ | 3.71 | 3.63 | 3.82 | 3.74 | 3.66 | 3.78 | 3.70 | 3.73 | 3.57 | 3.63 |
|  | RI | 1.802 | 1.791 | 1.819 | 1.807 | 1.796 | 1.811 | 1.800 | 1.804 | 1.782 | 1.790 |

|  |  | Exemplary Example Number | | | | | | | | | |
|---|---|---|---|---|---|---|---|---|---|---|---|
|  |  | 171 | 172 | 173 | 174 | 175 | 176 | 177 | 178 | 179 | 180 |
| Component (Mol. %) | $SiO_2$ | 53.61 | 51.56 | 52.72 | 54.18 | 51.23 | 52.41 | 53.49 | 54.88 | 44.83 | 44.84 |
|  | $Nb_2O5$ | 12.01 | 13.2 | 12.28 | 11.11 | 12.84 | 11.93 | 11.06 | 9.98 | 5.98 | 7.27 |
|  | BaO | 10.73 | 12.95 | 11.82 | 10.4 | 13.56 | 12.41 | 11.33 | 9.98 | 14.94 | 14.94 |
|  | $Na_2O$ | 6.49 | 6.28 | 6.27 | 6.26 | 5.99 | 5.99 | 5.99 | 11.96 | 11.95 | 11.95 |
|  | $TiO_2$ | 11.17 | 10.02 | 11.08 | 12.4 | 10.72 | 11.75 | 12.74 | 13.97 | 4.98 | 6.28 |
|  | $ZrO_2$ | 1.99 | 1.99 | 2 | 1.99 | 1.99 | 1.99 | 2 | 1.99 | 2 | 2.64 |
|  | $K_2O$ | 3.75 | 3.7 | 3.57 | 3.41 | 3.35 | 3.23 | 3.13 | 2.99 | 0 | 0 |
|  | CaO | 0 | 0 | 0 | 0 | 0 | 0 | 0 | 0 | 0 | 0 |
|  | $La_2O_3$ | 0 | 0 | 0 | 0 | 0 | 0 | 0 | 0 | 3.88 | 2.06 |
|  | $Y_2O_3$ | 0 | 0 | 0 | 0 | 0 | 0 | 0 | 0 | 11.06 | 9.66 |
|  | ZnO | 0 | 0 | 0 | 0 | 0 | 0 | 0 | 0 | 0 | 0 |
|  | SrO | 0.22 | 0.27 | 0.24 | 0.22 | 0.28 | 0.25 | 0.24 | 0.21 | 0.31 | 0.31 |
|  | $Li_2O$ | 0 | 0 | 0 | 0 | 0 | 0 | 0 | 0 | 0 | 0 |
|  | $Al_2O_3$ | 0.02 | 0.02 | 0.02 | 0.02 | 0.03 | 0.02 | 0.02 | 0.02 | 0.03 | 0.03 |
|  | $WO_3$ | 0 | 0 | 0 | 0 | 0 | 0 | 0 | 0 | 0 | 0 |

TABLE 5-continued

Exemplary Glass Compositions

|  |  |  |  |  |  |  |  |  |  |  |  |
|---|---|---|---|---|---|---|---|---|---|---|---|
|  | MgO | 0 | 0 | 0 | 0 | 0 | 0 | 0 | 0 | 0 | 0 |
|  | $CeO_2$ | 0 | 0 | 0 | 0 | 0 | 0 | 0 | 0 | 0.02 | 0.01 |
|  | $Ta_2O_5$ | 0 | 0 | 0 | 0 | 0 | 0 | 0 | 0 | 0 | 0 |
|  | $Fe_2O_3$ | 0 | 0 | 0 | 0 | 0 | 0 | 0 | 0 | 0 | 0 |
| Measured | D, g/cm³ |  |  |  |  |  |  |  |  |  | 4.108 |
|  | $n_d$ |  |  |  |  |  |  |  |  |  |  |
|  | $n_C$ |  |  |  |  |  |  |  |  |  |  |
|  | $n_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm³ | 3.53 | 3.66 | 3.59 | 3.50 | 3.68 | 3.61 | 3.54 | 3.45 | 4.35 | 4.22 |
|  | RI | 1.777 | 1.794 | 1.784 | 1.771 | 1.796 | 1.786 | 1.776 | 1.764 | 1.830 | 1.825 |

Exemplary Example Number

|  |  | 181 | 182 | 183 | 184 | 185 | 186 | 187 | 188 | 189 | 190 |
|---|---|---|---|---|---|---|---|---|---|---|---|
| Component (Mol. %) | $SiO_2$ | 44.82 | 44.84 | 44.82 | 44.81 | 44.81 | 44.82 | 44.79 | 44.81 | 44.81 | 44.82 |
|  | $Nb_2O_5$ | 5.98 | 7.29 | 7.34 | 5.98 | 7.37 | 8.27 | 5.98 | 8.32 | 9.14 | 6.67 |
|  | BaO | 14.94 | 14.94 | 14.93 | 14.93 | 14.94 | 14.93 | 14.93 | 14.93 | 14.94 | 14.93 |
|  | $Na_2O$ | 11.96 | 11.96 | 11.95 | 11.94 | 11.95 | 11.96 | 11.94 | 11.96 | 11.96 | 11.95 |
|  | $TiO_2$ | 4.98 | 6.29 | 6.34 | 4.98 | 6.38 | 7.27 | 4.98 | 7.32 | 8.13 | 5.68 |
|  | $ZrO_2$ | 2 | 2.65 | 2.68 | 1.99 | 2.69 | 3.14 | 2 | 3.16 | 3.57 | 2.34 |
|  | $K_2O$ | 0 | 0 | 0 | 0 | 0 | 0 | 0 | 0 | 0 | 0 |
|  | CaO | 0 | 0 | 0.02 | 0.02 | 0.02 | 0.02 | 0.02 | 0.02 | 0.02 | 0.02 |
|  | $La_2O_3$ | 5.65 | 3.67 | 7.06 | 12.1 | 8.86 | 6.77 | 14.93 | 9.07 | 7.04 | 6.08 |
|  | $Y_2O_3$ | 9.28 | 7.99 | 4.46 | 2.84 | 2.6 | 2.44 | 0 | 0 | 0 | 7.13 |
|  | ZnO | 0 | 0 | 0 | 0 | 0 | 0 | 0 | 0 | 0 | 0 |
|  | SrO | 0.31 | 0.31 | 0.31 | 0.3 | 0.31 | 0.3 | 0.31 | 0.31 | 0.31 | 0.31 |
|  | $Li_2O$ | 0 | 0 | 0 | 0 | 0 | 0 | 0 | 0 | 0 | 0 |
|  | $Al_2O_3$ | 0.04 | 0.03 | 0.03 | 0.02 | 0.02 | 0.03 | 0.03 | 0.04 | 0.03 | 0.03 |
|  | $WO_3$ | 0 | 0 | 0 | 0 | 0 | 0 | 0 | 0 | 0 | 0 |
|  | MgO | 0 | 0 | 0 | 0 | 0 | 0 | 0 | 0 | 0 | 0 |
|  | $CeO_2$ | 0.03 | 0.02 | 0.04 | 0.07 | 0.06 | 0.04 | 0.09 | 0.06 | 0.04 | 0.03 |
|  | $Ta_2O_5$ | 0 | 0 | 0 | 0 | 0 | 0 | 0 | 0 | 0 | 0 |
|  | $Fe_2O_3$ | 0 | 0 | 0 | 0 | 0 | 0 | 0 | 0 | 0 | 0 |
| Measured | D, g/cm³ |  |  |  |  |  |  |  |  |  |  |
|  | $n_d$ |  |  |  |  |  |  |  |  |  |  |
|  | $n_C$ |  |  |  |  |  |  |  |  |  |  |
|  | $n_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm³ | 4.39 | 4.25 | 4.32 | 4.54 | 4.36 | 4.25 | 4.60 | 4.30 | 4.20 | 4.35 |
|  | RI | 1.833 | 1.828 | 1.834 | 1.845 | 1.838 | 1.833 | 1.850 | 1.837 | 1.832 | 1.833 |

Exemplary Example Number

|  |  | 191 | 192 | 193 | 194 | 195 | 196 | 197 | 198 | 199 | 200 |
|---|---|---|---|---|---|---|---|---|---|---|---|
| Component (Mol. %) | $SiO_2$ | 44.83 | 44.84 | 44.82 | 44.83 | 44.84 | 44.84 | 44.84 | 44.83 | 44.79 | 37.96 |
|  | $Nb_2O_5$ | 7.61 | 8.45 | 7.64 | 8.53 | 9.3 | 9.35 | 9.78 | 10.09 | 17.92 | 9.49 |
|  | BaO | 14.94 | 14.94 | 14.94 | 14.94 | 14.95 | 14.94 | 14.94 | 14.94 | 19.91 | 4 |
|  | $Na_2O$ | 11.96 | 11.96 | 11.96 | 11.96 | 11.95 | 11.95 | 11.95 | 11.96 | 5.97 | 3.99 |
|  | $TiO_2$ | 6.61 | 7.45 | 6.65 | 7.54 | 8.3 | 8.35 | 8.78 | 9.1 | 4.98 | 9.49 |
|  | $ZrO_2$ | 2.81 | 3.23 | 2.83 | 3.27 | 3.65 | 3.68 | 3.89 | 4.04 | 1.99 | 9.49 |
|  | $K_2O$ | 0 | 0 | 0 | 0 | 0 | 0 | 0 | 0 | 3.98 | 3.99 |
|  | CaO | 0 | 0 | 0 | 0 | 0 | 0 | 0 | 0 | 0 | 4 |
|  | $La_2O_3$ | 4.16 | 2.45 | 5.82 | 5.58 | 3.84 | 5.37 | 3.26 | 4.67 | 0 | 9.49 |
|  | $Y_2O_3$ | 6.71 | 6.33 | 4.97 | 2.98 | 2.81 | 1.14 | 2.18 | 0 | 0 | 3.99 |
|  | ZnO | 0 | 0 | 0 | 0 | 0 | 0 | 0 | 0 | 0 | 0 |
|  | SrO | 0.31 | 0.31 | 0.3 | 0.31 | 0.31 | 0.31 | 0.31 | 0.31 | 0.42 | 3.99 |
|  | $Li_2O$ | 0 | 0 | 0 | 0 | 0 | 0 | 0 | 0 | 0 | 0 |
|  | $Al_2O_3$ | 0.03 | 0.03 | 0.03 | 0.03 | 0.03 | 0.03 | 0.03 | 0.03 | 0.04 | 0.01 |
|  | $WO_3$ | 0 | 0 | 0 | 0 | 0 | 0 | 0 | 0 | 0 | 0 |

TABLE 5-continued

Exemplary Glass Compositions

|  |  |  |  |  |  |  |  |  |  |  |  |
|---|---|---|---|---|---|---|---|---|---|---|---|
|  | MgO | 0 | 0 | 0 | 0 | 0 | 0 | 0 | 0 | 0 | 0.03 |
|  | $CeO_2$ | 0.03 | 0.01 | 0.03 | 0.03 | 0.02 | 0.03 | 0.02 | 0.03 | 0 | 0.06 |
|  | $Ta_2O_5$ | 0 | 0 | 0 | 0 | 0 | 0 | 0 | 0 | 0.01 | 0 |
|  | $Fe_2O_3$ | 0 | 0 | 0 | 0 | 0 | 0 | 0 | 0 | 0 | 0.01 |
| Measured | D, g/cm³ |  |  |  |  |  |  |  |  |  |  |
|  | $n_d$ |  |  |  |  |  |  |  |  |  |  |
|  | $n_C$ |  |  |  |  |  |  |  |  |  |  |
|  | $n_F$ |  |  |  |  |  |  |  |  |  |  |
|  | An. Pt, °C. |  |  |  |  |  |  |  |  |  |  |
|  | Strain P, °C. |  |  |  |  |  |  |  |  |  |  |
| Predicted | D, g/cm³ | 4.24 | 4.14 | 4.28 | 4.21 | 4.11 | 4.14 | 4.07 | 4.08 | 4.08 | 4.52 |
|  | RI | 1.828 | 1.824 | 1.832 | 1.830 | 1.826 | 1.829 | 1.825 | 1.827 | 1.854 | 1.932 |

TABLE 6

Comparative Glass Compositions

| Comparative Example Number | Composition (Mole %) | Density (g/cm³)- measured | Density (g/cm³)- predicted | Refractive Index- measured | Refractive Index- predicted |
|---|---|---|---|---|---|
| C1 | 47.95 $SiO_2$<br>18.45 $TiO_2$<br>16.21 $Na_2O$<br>5.44 $ZrO_2$<br>11.95 CaO | 2.8715 | | 1.676 | 1.662 |
| C2 | 46.96 $SiO_2$<br>19.34 $TiO_2$<br>16.26 $Na_2O$<br>5.45 $ZrO_2$<br>11.98 CaO | 3.0227 | | 1.688 | 1.6717 |
| C3 | 53.68 $SiO_2$<br>15.36 $TiO_2$<br>2.61 $Nb_2O_5$<br>4.43 BaO<br>3.88 $ZrO_2$<br>8.26 CaO<br>5.85 $Na_2O$<br>2.98 SrO<br>2.95 $K_2O$ | 2.9088 | | 1.675 | 1.6616 |
| C4 | 49.47 $SiO_2$<br>19.02 $TiO_2$<br>15.98 $Na_2O$<br>11.78 CaO<br>3.75 $ZrO_2$ | 3.0099 | | 1.694 | 1.675 |
| C5 | 55.68 $SiO_2$<br>15.78 $TiO_2$<br>4.14 $Nb_2O_5$<br>4.57 SrO<br>3.84 $ZrO_2$<br>6.52 $Na_2O$<br>5.86 CaO<br>2.51 $K_2O$<br>1.10 BaO | 2.9972 | | 1.696 | 1.6784 |
| C6 | 19.91 $Bi_2O_3$<br>49.77 $SiO_2$<br>9.96 BaO<br>9.95 $TiO_2$<br>9.96 $Na_2O$<br>0.45 Er | 3.0621 | | 1.7271 | 1.728 |
| C7 | 49.14 $SiO_2$<br>12.84 $TiO_2$<br>2.69 $Nb_2O_5$<br>9.91 CaO<br>4.60 SrO<br>3.84 $ZrO_2$<br>6.40 $Na_2O$<br>2.59 BaO<br>5.47 $B_2O_3$<br>2.53 $K_2O$ | 3.012 | | 1.699 | 1.6847 |
| C8 | 18.78 BaO<br>42.38 $SiO_2$<br>6.80 $La_2O_3$<br>16.63 $TiO_2$<br>4.17 $Nb_2O_5$<br>4.49 $ZrO_2$<br>3.18 $B_2O_3$<br>3.57 $Na_2O$ | 3.55 | 3.5044 | 1.7994 | 1.7791 |
| C9 | 19.01 BaO<br>42.91 $SiO_2$<br>6.88 $La_2O_3$<br>16.84 $TiO_2$<br>4.22 $Nb_2O_5$<br>4.55 $ZrO_2$<br>3.22 $B_2O_3$<br>2.38 $K_2O$ | 4.22 | 4.2294 | 1.8308 | 1.8343 |
| C10 | 18.78 BaO<br>42.38 $SiO_2$<br>6.80 $La_2O_3$<br>16.63 $TiO_2$<br>4.17 $Nb_2O_5$<br>4.49 $ZrO_2$<br>3.18 $B_2O_3$<br>3.57 $Na_2O$ | 3.74 | 3.6854 | 1.8364 | 1.8199 |
| C11 | 53.09 $SiO_2$<br>15.60 BaO<br>19.97 $TiO_2$<br>6.43 $Na_2O$<br>4.90 ZnO | | 4.2669 | 1.8183 | 1.8538 |

According to a first aspect, a glass composition is provided that comprises greater than or equal to about 45.0 mol. % and less than or equal about 57.0 mol. % $SiO_2$, greater than or equal to about 5.0 mol. % and less than or equal to about 23.0 mol. % $Nb_2O_5$, greater than or equal to about 0.0 mol. % and less than or equal to about 20.0 mol. % $TiO_2$, greater than or equal to about 0.0 mol. % and less than or equal to about 6.5 mol. % $ZrO_2$, greater than or equal to about 0.0 mol. % and less than or equal to about 16.0 mol. % $La_2O_3$, greater than or equal to about 0.0 mol. % and less than or equal to about 1.0 mol. % $B_2O_3$, greater than or equal to about 0.0 mol. % and less than or equal about 1.0 mol. % $Li_2O$, greater than or equal to about 0.0 mol. % and less than or equal to about 5.0 mol. % $Bi_2O_3$, greater than or equal to about 45.0 mol. % and less than or equal to about 60.0 mol. % $SiO_2+Al_2O_3+B_2O_3$, greater than or equal to about 1.0 mol. % and less than or equal to about 20.0 mol. % $Li_2O+Na_2O+K_2O$, and greater than or equal to about 1.0 mol. % and less than or equal to 30.0 mol. % MgO+CaO+SrO+BaO+ZnO, and greater than or equal to about 5.0 mol. % and less than or equal to about 40.0 mol. % $Nb_2O_5+TiO_2$ and wherein the composition is essentially free of PbO.

According to a second aspect, the first aspect further wherein the glass composition comprises an additional rare earth metal oxides other than $La_2O_3$, and wherein the total sum of the rare earth metal oxides, including $La_2O_3$, is greater than or equal to about 0.0 mol. % and less than or equal to about 25.0 mol. %.

According to a third aspect, the second aspect further wherein the glass composition comprises $La_2O_3$ and/or $Y_2O_3$ as the rare earth metal oxides.

According to a fourth aspect, the first aspect further wherein the glass composition further comprises $Rb_2O$ and/or $Cs_2O$, and wherein the total sum of alkali metal oxides ($Li_2O+Na_2O+K_2O+Rb_2O+Cs_2O$) is greater than or equal to about 1.0 mol. % and less than or equal to about 20.0 mol. %.

According to a fifth aspect, the glass composition according to any of the previous aspects, wherein the glass composition has a density of less than or equal to about 4.0 g/cm$^3$.

According to a sixth aspect, the glass composition according to any of the previous aspects, wherein the glass composition has a density of less than or equal to about 3.6 g/cm$^3$.

According to a seventh aspect, the glass composition according to any of the previous aspects, wherein the glass composition has a refractive index $n_d$ of greater than or equal to about 1.80.

According to an eight aspect, the glass composition according to any of the previous aspects, wherein the glass composition has an Abbe number $v_d$ greater than or equal to about 25.0 and less than or equal to about 40.0.

According to a ninth aspect, the glass composition according to any of the previous aspects, wherein the glass composition has a ratio $(n_d-1)/d$ greater than or equal to about 0.20 cm$^3$/gram, where $n_d$ is refractive index and d is density, g/cm$^3$.

According to a tenth aspects, a glass composition comprising greater than or equal to about 45.0 mol. % $SiO_2$, greater than or equal to about 0.0 mol. % and less than or equal to about 1.0 mol. % $Li_2O$, greater than or equal to about 1.0 mol. % and less than or equal to about 19.5 mol. % $TiO_2$, greater than or equal to about 1.0 mol. % and less than or equal to about 20.0 mol. % monovalent metal oxides, greater than or equal to about 1.0 mol. % divalent metal oxides, and less than or equal to about 40.0 mol. % a total of monovalent and divalent metal oxides, wherein the glass composition is essentially free of PbO and fluorine, and wherein the glass composition satisfies the following condition: Refractive Index−1.42−0.10×Density (g/cm$^3$)>0.00.

According to an eleventh aspect, the tenth aspect further wherein the glass composition satisfies the following condition: Refractive Index−1.43−0.10×Density (g/cm$^3$)>0.00.

According to a twelfth aspect, a glass composition comprising greater than or equal to about 45.0 mol. % and less than or equal to about 57.0 mol. % $SiO_2$, greater than or equal to about 5.0 mol. % and less than or equal to about 23.0 mol. % $Nb_2O_5$, greater than or equal to about 0.0 mol. % and less than or equal to about 20.0 mol. % $TiO_2$, greater than or equal to about 0.0 mol. % and less than or equal to about 6.5 mol. % $ZrO_2$, greater than or equal to about 0.0 mol. % and less than or equal to about 16.0 mol. % $La_2O_3$, greater than or equal to about 0.0 mol. % and less than or equal to about 1.0 mol. % $B_2O_3$, greater than or equal to about 45.0 mol. % and less than or equal to about 60.0 mol. % $SiO_2+Al_2O_3+B_2O_3$, greater than or equal to about 1.0 mol. % and less than or equal to about 20.0 mol. % $Li_2O+Na_2O+K_2O$, greater than or equal to about 1.0 mol. % and less than or equal to about 30.0 mol. % MgO+CaO+SrO+BaO+ZnO, and greater than or equal to about 5.0 mol. % and less than or equal to about 40.0 mol. % $Nb_2O_5+TiO_2$, greater than or equal to 35.0 mol. % and less than or equal to 60.0 mol. % $SiO_2$, greater than or equal to about 0.0 mol. % and less than or equal to about 1.0 mol. % $Li_2O$, greater than or equal to about 1.0 mol. % and less than or equal to about 20.0 mol. % $TiO_2$, greater than or equal to about 1.0 mol. % monovalent metal oxides, greater than or equal to about 1.0 mol. % divalent metal oxides, and less than or equal to about 40.0 mol. % a total of monovalent and divalent metal oxides, wherein the glass composition is essentially free of Pb, F, Tl, and Bi, and wherein the glass composition satisfies the following condition: Refractive Index=2.21−0.0086×$SiO_2$ (mol. %).

According to a thirteenth aspect, the twelfth aspect further wherein the glass composition satisfies the following condition: Refractive Index−2.23+0.0086×$SiO_2$ (mol. %)>0.00.

According to a fourteenth aspect, a glass composition comprising greater than or equal to about 45.0 mol. % and less than or equal to about 57.0 mol. % $SiO_2$, greater than or equal to about 5.0 mol. % and less than or equal to about 23.0 mol. % $Nb_2O_5$, greater than or equal to about 0.0 mol. % and less than or equal to about 20.0 mol. % $TiO_2$, greater than or equal to about 0.0 mol. % and less than or equal to about 6.5 mol. % $ZrO_2$, greater than or equal to about 0.0 mol. % and less than or equal to about 16.0 mol. % $La_2O_3$, greater than or equal to about 0.0 mol. % and less than or equal to about 1.0 mol. % $B_2O_3$, greater than or equal to about 45.0 mol. % and less than or equal to about 60.0 mol. % $SiO_2+Al_2O_3+B_2O_3$, greater than or equal to about 1.0 mol. % and less than or equal to about 20.0 mol. % $Li_2O+Na_2O+K_2O$, greater than or equal to about 1.0 mol. % and less than or equal to about 30.0 mol. % MgO+CaO+SrO+BaO+ZnO, and greater than or equal to about 5.0 mol. % and less than or equal to about 40.0 mol. % $Nb_2O_5+TiO_2$.

According to a fifteenth aspect, a glass composition comprising greater than or equal to about 35.0 mol. % and less than or equal to about 60.0 mol. % $SiO_2$, greater than or equal to about 0.0 mol. % and less than or equal to about 1.0 mol. % $Li_2O$, greater than or equal to about 1.0 mol. % and less than or equal to about 20.0 mol. % $TiO_2$, greater than or equal to about 0.0 mol. % and less than or equal to about 10.0 mol. % $BiO_3$, greater than or equal to about 1.0 mol. % monovalent metal oxides, greater than or equal to about 1.0 mol. % divalent metal oxides, and less than or equal to about 40.0 mol. % a total of monovalent and divalent metal oxides, wherein the glass composition is essentially free of Pb, fluorine, and thallium, wherein the refractive index of the glass composition is greater than 1.7, and wherein the glass composition satisfies the following condition: Refractive Index=2.21−0.0086×$SiO_2$ (mol. %).

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass composition comprising:
   a content of $SiO_2$ that is greater than or equal to about 44.0 mol. % and less than or equal to about 60.0 mol. %;
   a content of ZnO that is less than or equal to about 1.0 mol. %;
   a content of MgO+CaO+SrO+BaO+ZnO that is greater than or equal to about 1.0 mol. % and less than or equal to about 30.0 mol. %; and
   a content of $TiO_2$ that is less than or equal to about 20.0 mol. %,
   wherein:
      the glass composition is essentially free of Pb and Bi,
      the glass composition has a refractive index $n_d$ greater than or equal to 1.75, and
      the glass composition has a density less than or equal to about 4.5 g/cm³.

2. The glass composition according to claim 1, wherein the refractive index $n_d$ of the glass composition is greater than or equal to 1.78.

3. The glass composition according to claim 2, wherein the refractive index $n_d$ of the glass composition is greater than or equal to 1.80.

4. The glass composition according to claim 3, wherein the refractive index $n_d$ of the glass composition is greater than or equal to 1.82.

5. The glass composition according to claim 1, wherein the density of the glass composition is less than or equal to 4.0 g/cm³.

6. The glass composition according to claim 5, wherein the density of the glass composition is less than or equal to 3.7 g/cm³.

7. The glass composition according to claim 1, wherein the content of $SiO_2$ is greater than or equal to about 45.0 mol. % and less than or equal to about 55.0 mol. %.

8. The glass composition according to claim 1, wherein the content of $TiO_2$ is greater than or equal to about 1.0 mol. % and less than or equal to about 18.0 mol. %.

9. The glass composition according to claim 1, further comprising a content of $Nb_2O_5$ that is greater than or equal to about 5.0 mol. % and less than or equal to about 25.0 mol. %.

10. The glass composition according to claim 1, wherein the glass composition comprises a content of rare earth metal oxides that is less than or equal to about 25.0 mol. %.

11. The glass composition according to claim 1, wherein the glass composition comprises a content of monovalent metal oxides that is less than or equal to about 25.0 mol. %.

12. The glass composition according to claim 1, wherein the glass composition comprises a content of divalent metal oxides that is greater than or equal to about 1.0 mol. % and less than or equal to about 30.0 mol. %.

13. The glass composition according to claim 1, wherein the glass composition comprises a total content of both monovalent metal oxides and divalent metal oxides that is greater than or equal to about 1.0 mol. % and less than or equal to about 35.0 mol. %.

14. The glass composition according to claim 1, wherein the glass composition is essentially free of Fe, Cr, Cu, V, Mo, Co, and F.

15. The glass composition according to claim 1, wherein the glass composition comprises a total content of $Al_2O_3$, $B_2O_3$, and $P_2O_5$ that is less than or equal to about 0.1 mol. %.

16. The glass composition according to claim 1, wherein the glass composition satisfies the following condition:
$$\text{refractive index}-1.42-0.10\times\text{density (g/cm}^3)>0.00.$$

17. The glass composition according to claim 1, wherein the glass composition satisfies the following condition:
$$\text{refractive index}-2.21+0.0086\times SiO_2 \text{ (mol. \%)}>0.00.$$

18. A glass composition comprising:
   a content of $SiO_2$ that is greater than or equal to about 35.0 mol. % and less than or equal to about 60.0 mol. %; and
   a content of MgO+CaO+SrO+BaO+ZnO that is greater than or equal to about 1.0 mol. % and less than or equal to about 30.0 mol. %,
   wherein the glass composition satisfies the following conditions:

$$\text{refractive index}-1.42-0.10\times\text{density (g/cm}^3)>0.00,$$
and
$$\text{refractive Index}-2.21+0.0086\times SiO_2 \text{ (mol. \%)}>0.00.$$

19. A glass composition comprising:
   a content of $SiO_2$ that is greater than or equal to about 35.0 mol. % and less than or equal to about 60.0 mol. %;
   a content of MgO+CaO+SrO+BaO+ZnO that is greater than or equal to about 1.0 mol. % and less than or equal to about 30.0 mol. %; and
   a content of $TiO_2$ that is less than or equal to about 20.0 mol. %,
   wherein the glass composition satisfies the following condition:

$$\text{refractive index}-2.21+0.0086\times SiO_2 \text{ (mol. \%)}>0.00.$$

* * * * *

UNITED STATES PATENT AND TRADEMARK OFFICE
CERTIFICATE OF CORRECTION

| | |
|---|---|
| PATENT NO. | : 11,787,729 B2 |
| APPLICATION NO. | : 17/313281 |
| DATED | : October 17, 2023 |
| INVENTOR(S) | : Jian Luo et al. |

It is certified that error appears in the above-identified patent and that said Letters Patent is hereby corrected as shown below:

On the Title Page

On the page 2, in Column 2, under "Other Publications", Line 15, delete "siliciate" and insert -- silicate --.

Signed and Sealed this
Fourth Day of June, 2024

Katherine Kelly Vidal
*Director of the United States Patent and Trademark Office*